(12) United States Patent
Zoppas et al.

(10) Patent No.: US 7,879,281 B2
(45) Date of Patent: Feb. 1, 2011

(54) INJECTION DEVICE AND PROCESS FOR PLASTIC OBJECTS

(75) Inventors: Matteo Zoppas, Conegliano (IT); Massimo Coran, Spresiano (IT); Jader Pavanetto, Mestre (IT)

(73) Assignee: S.I.P.A. Societa' Industrializzazione Progettazione E Automazione S.p.A., Vittorio Veneto (IT)

( * ) Notice: Subject to any disclaimer, the term of this patent is extended or adjusted under 35 U.S.C. 154(b) by 486 days.

(21) Appl. No.: 10/541,129

(22) PCT Filed: Oct. 5, 2004

(86) PCT No.: PCT/EP2004/052439

§ 371 (c)(1), (2), (4) Date: Nov. 29, 2006

(87) PCT Pub. No.: WO2005/037521

PCT Pub. Date: Apr. 28, 2005

(65) Prior Publication Data

US 2007/0157545 A1    Jul. 12, 2007

(30) Foreign Application Priority Data

Oct. 7, 2003    (IT)    ............ RM2003A0460

(51) Int. Cl.
B29C 45/17    (2006.01)
B29C 45/72    (2006.01)
B29C 31/00    (2006.01)
B29C 35/16    (2006.01)
B29C 49/64    (2006.01)

(52) U.S. Cl. ............ 264/334; 264/297.3; 264/297.8; 425/444; 425/547; 425/576

(58) Field of Classification Search .......... 425/436 RM, 425/444, 547, 576; 264/334, 297.3, 297.8
See application file for complete search history.

(56) References Cited

U.S. PATENT DOCUMENTS

| 3,187 A | | 1/1903 | Coran et al. ............ 425/547 |
|---|---|---|---|
| 4,140,464 A | * | 2/1979 | Spurr et al. ............ 425/533 |
| 4,786,455 A | * | 11/1988 | Krishnakumar et al. ..... 264/237 |
| 5,569,476 A | * | 10/1996 | van Manen et al. ........ 425/556 |
| 5,653,934 A | * | 8/1997 | Brun et al. ............ 264/334 |
| 6,062,845 A | * | 5/2000 | Conaway et al. .......... 425/444 |
| 6,129,883 A | | 10/2000 | Jacovich et al. ......... 264/297.3 |
| 6,143,225 A | * | 11/2000 | Domodossola et al. ..... 264/237 |
| 6,290,891 B1 | | 9/2001 | Galt ............ 264/237 |

(Continued)

Primary Examiner—Yogendra N Gupta
Assistant Examiner—Emmanuel S Luk
(74) Attorney, Agent, or Firm—Abelman, Frayne & Schwab

(57) ABSTRACT

A plastic preforms (5) molding device and process comprising an injection mold, containing a plurality of injection cavities, an arm (3) for extracting the preforms (5) from the mold, equipped with guillotine-like gripping elements, which moves between the existing space between the half molds when in the open position in order to grasp the preforms and the external position, a cooling turret (6), with the faces housing a group of cups (7) for the conditioning of the preforms (5), which effects a rotational movement around a horizontal axis and a vertical translation movement between the high position under the extraction arm to receive the preforms and the low position corresponding to the extraction table of the preforms (5), on which are indented longitudinal slots with teeth shaped constrictions in order to grasp the preforms under the ring (9) and to extract them from the cups (7).

22 Claims, 22 Drawing Sheets

U.S. PATENT DOCUMENTS 6,652,262 B2 * 11/2003 Kroeger ...................... 425/556
7,384,587 B2 * 6/2008 Unterlander et al. ........ 264/348
2001/0019730 A1 * 9/2001 van Manen et al. ......... 425/547
2003/0003187 A1 * 1/2003 Coran et al. ................. 425/547
2003/0107155 A1 * 6/2003 Olaru et al. ............... 264/328.1
2004/0115302 A1 * 6/2004 Rommes et al. ............. 425/526

* cited by examiner

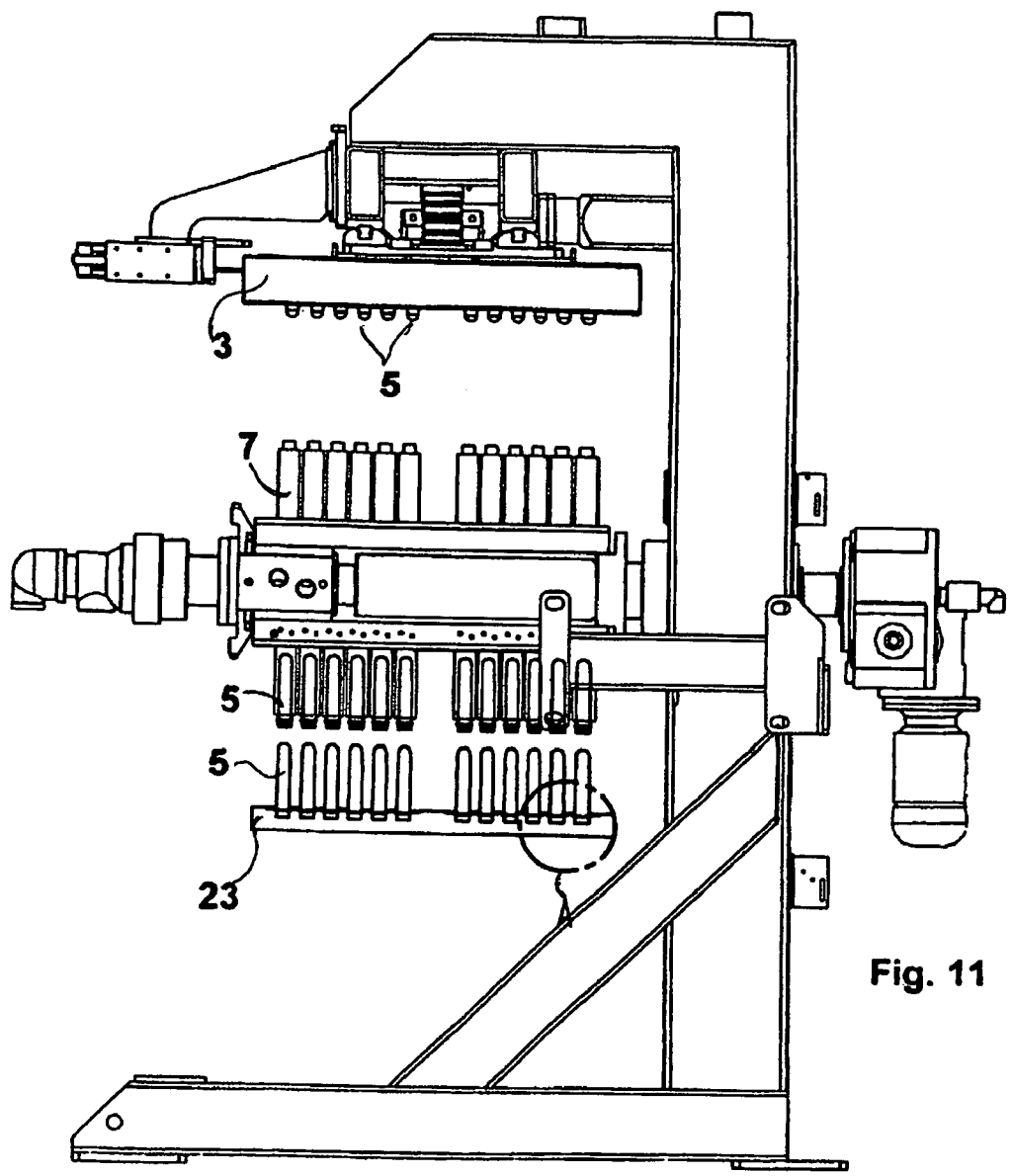
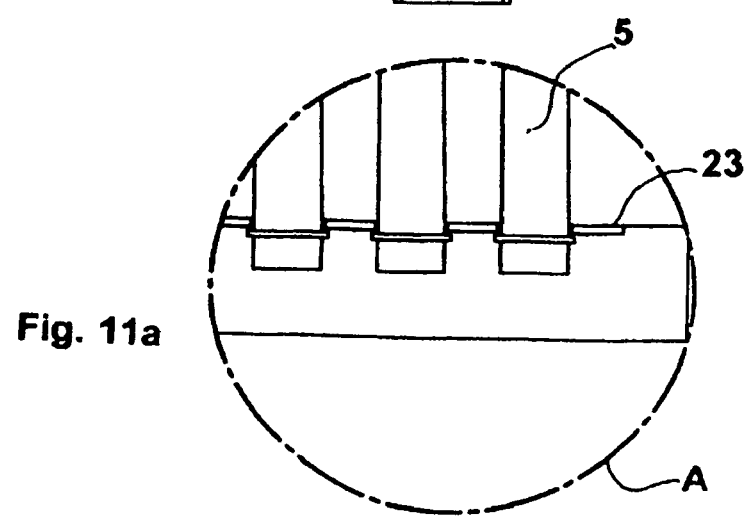
Fig. 11
Fig. 11a

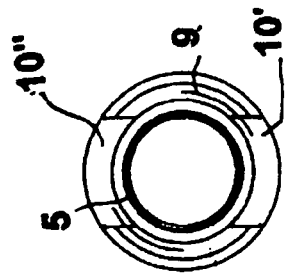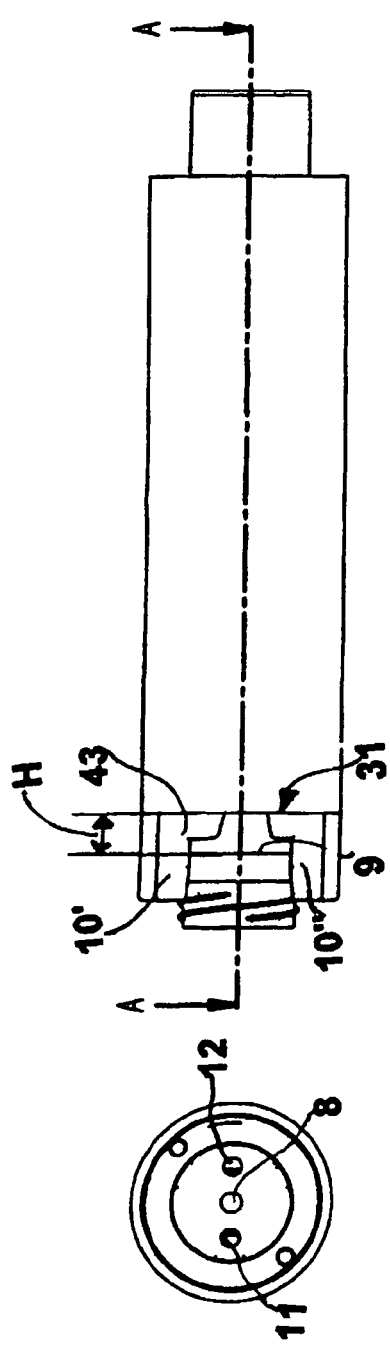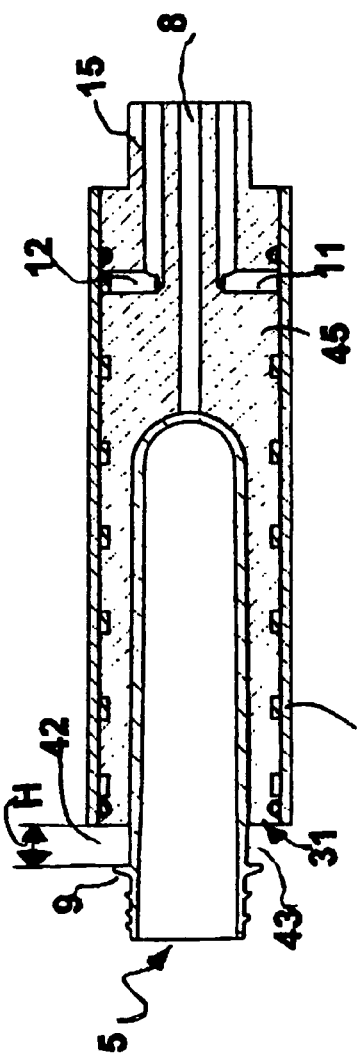

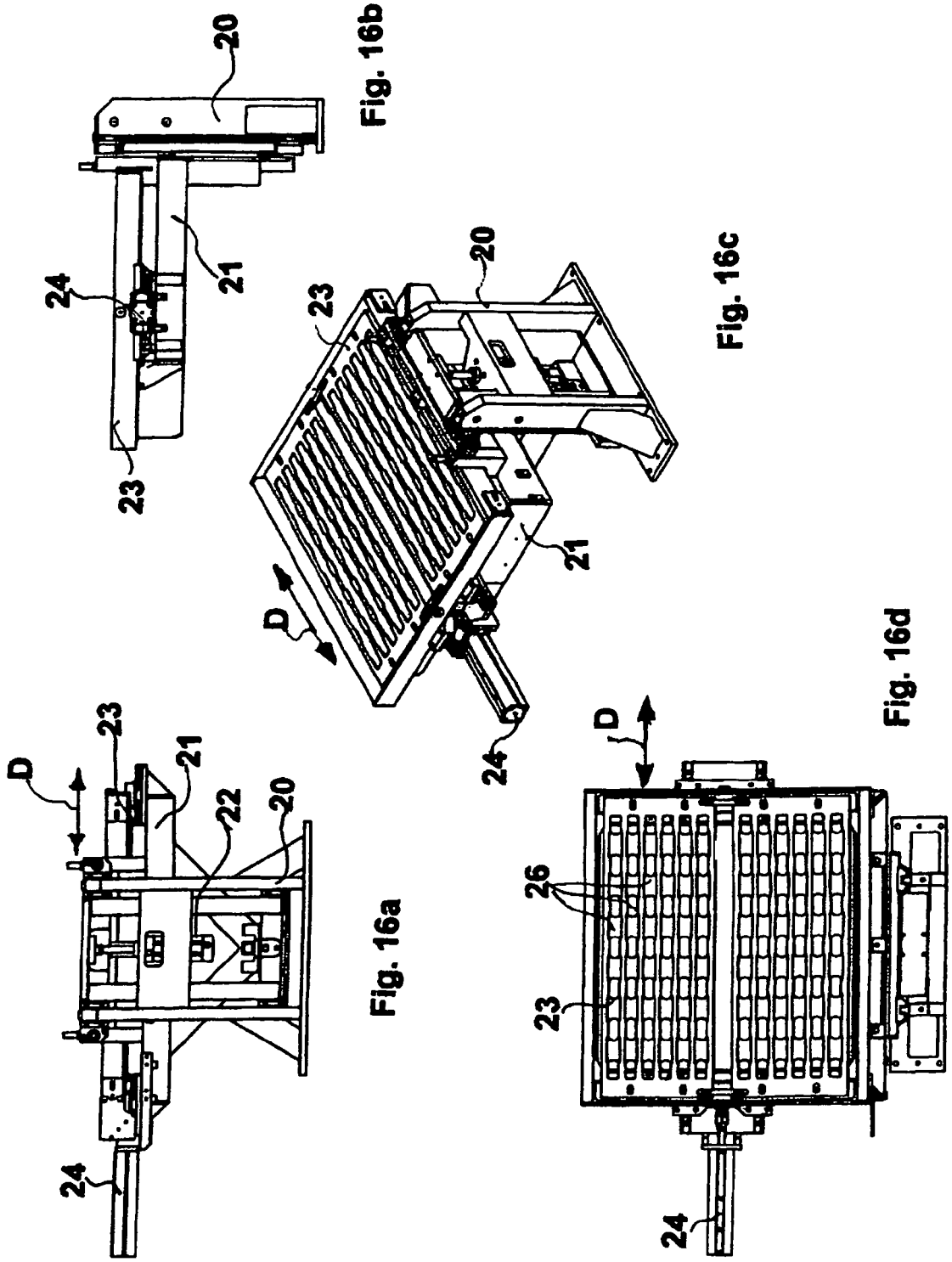

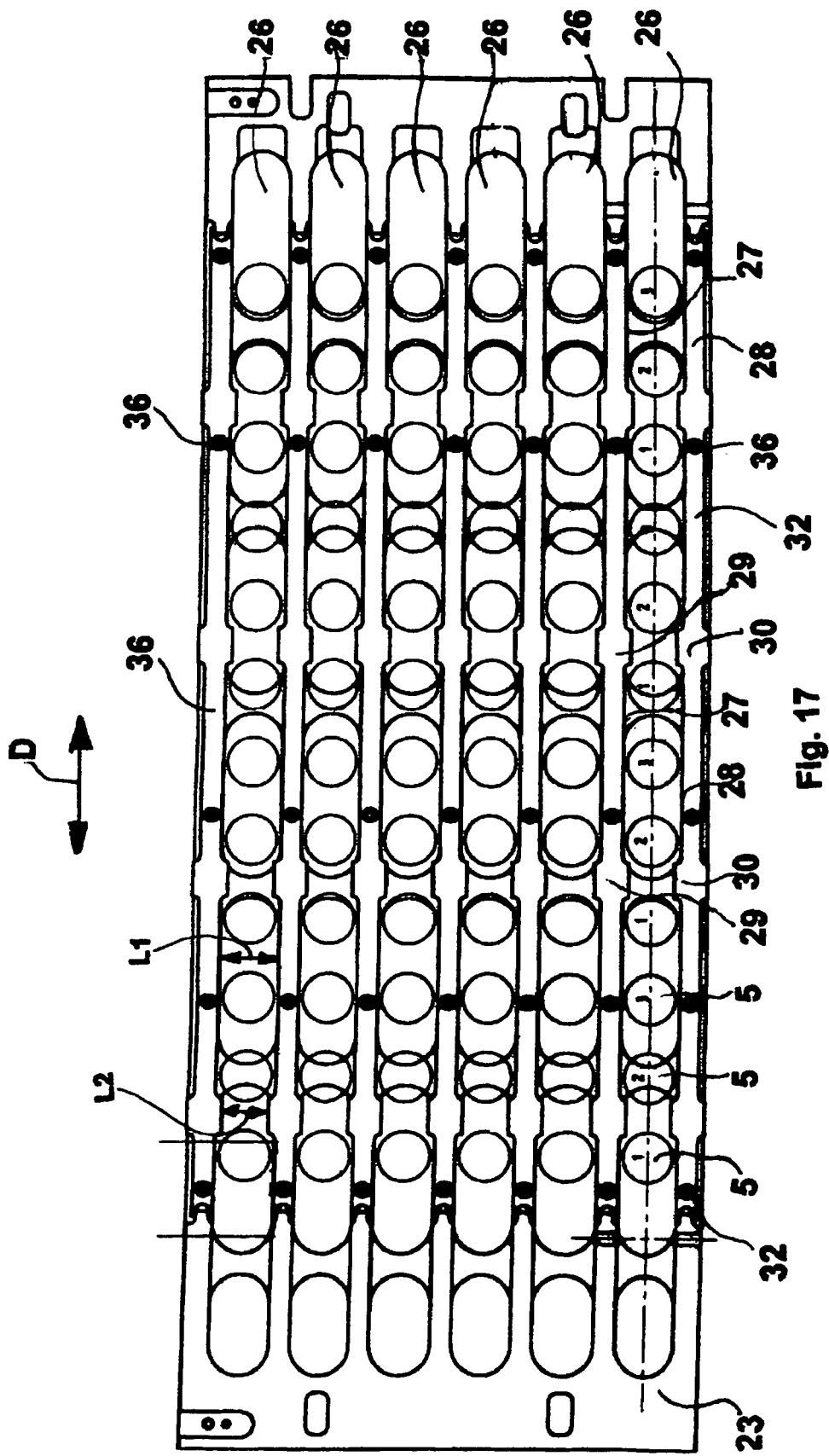

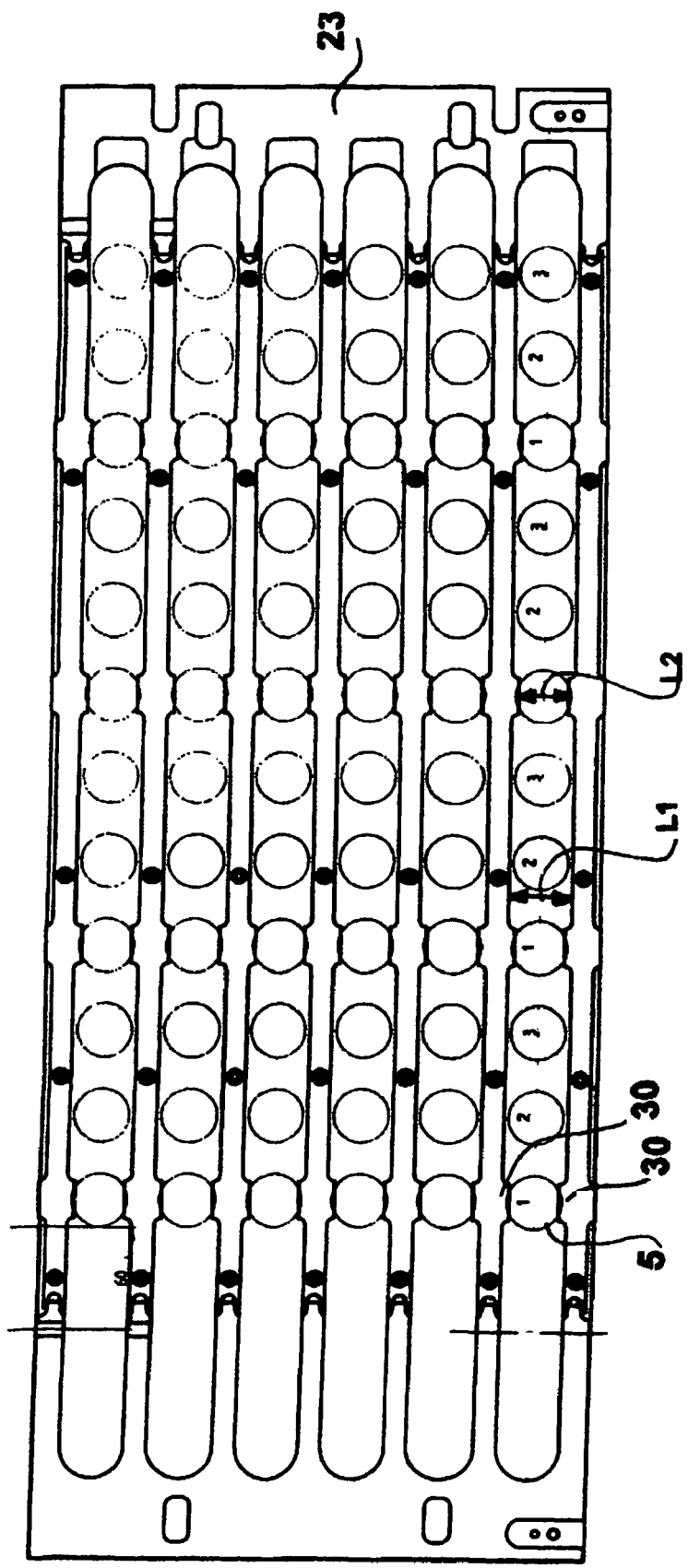

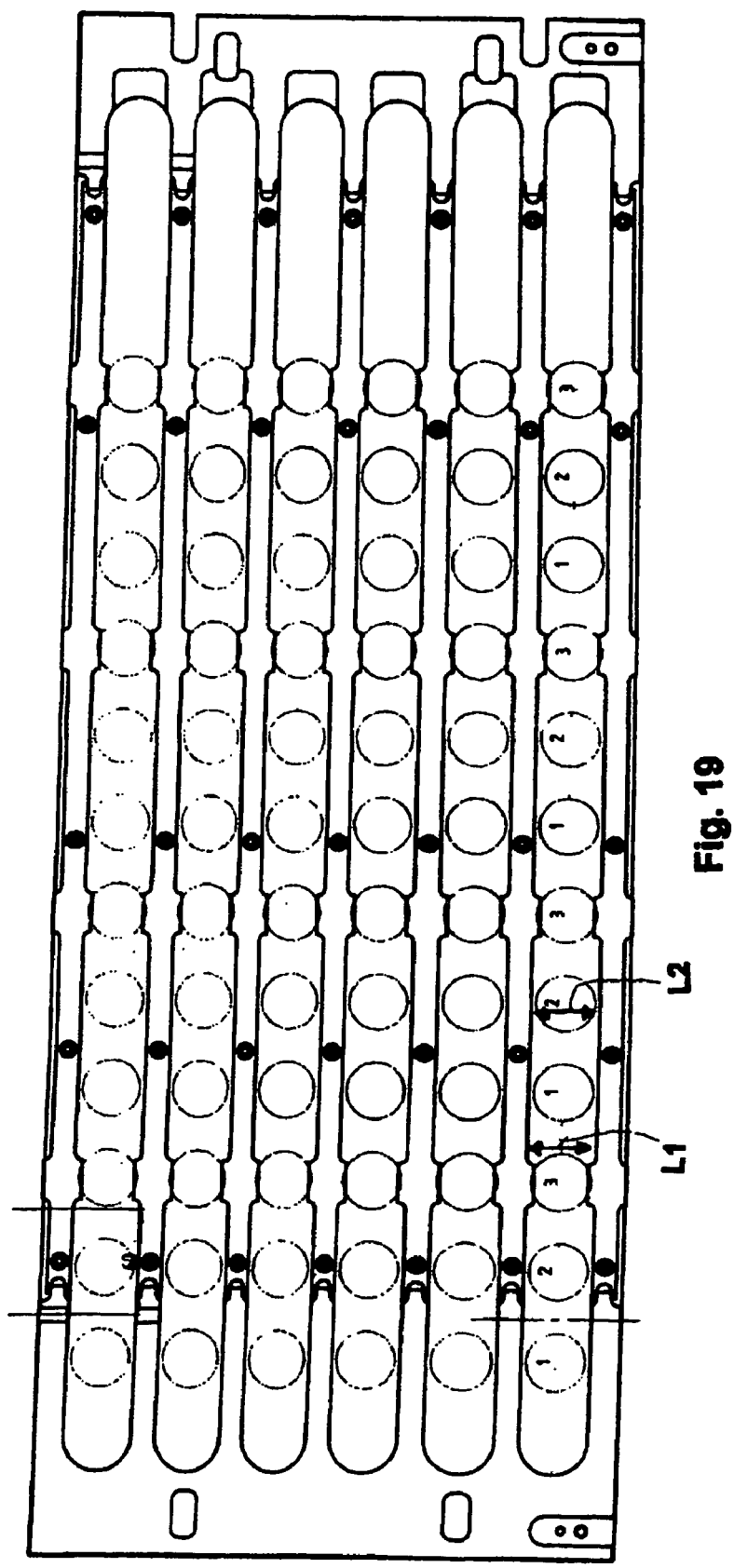

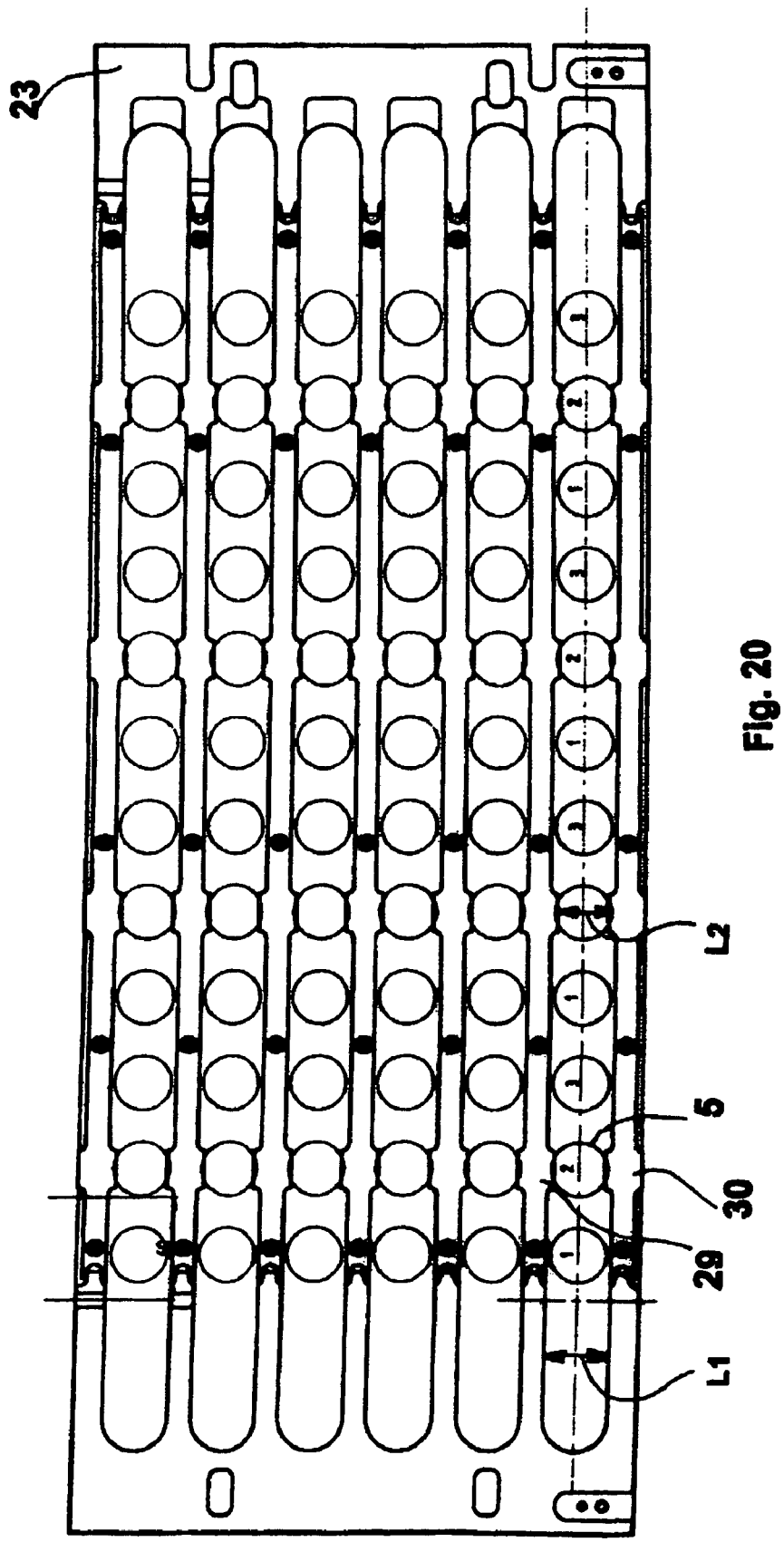

INJECTION DEVICE AND PROCESS FOR PLASTIC OBJECTS

FIELD OF THE INVENTION

The present invention concerns a device for moulding plastic objects, in particular plants for simultaneously injection moulding of different plastic articles such as the "preforms" or parisons which are aimed to be subsequently blown so as to be transformed into containers, in particular bottles or jars in plastic. The present invention refers also to the related moulding process.

STATE OF THE ART

For the production of containers, particularly for foods and for liquids, the practice has been for some time to make use of plastic materials and in particular PET (polyethylene terephthalate). Such containers, although being of various types, will here be described generically as bottles which in effect represent the containers most in use.

There exist two main types of production processes for plastic bottles, in both of which there is produced an intermediate product, the so called preform or parison. The first type of process is called single stage process and the relative moulding and blowing machines necessary to put it into operation represent a single stage plant, because they are designed to carry out in a continuous and automatic way the complete transformation process of the plastic material commencing from the granular state up to the finished containers ready for use.

The second type of process operates substantially like the first one, with the difference that following the injection moulding of the preforms the latter are cooled to a predefined temperature and kept in an intermediate stocking location where they cool to room temperature. The blowing operation is carried out subsequently and in this case it is firstly necessary to subject the preforms to a heating process to make them sufficiently plastic to undergo blowing.

The first step of the container production process, which consists of the injection moulding of the preforms, is carried out using moulds provided with a group of injection cavities into which resin in a molten state has been injected, and which remain closed for a predetermined time, sufficient to permit cooling and the consequent solidifying of the preforms, allowing them to be handled without the risk of their being deformed. As during such steps of cooling and consolidation of the preforms the mould is kept closed and therefore occupied, the longer the cooling step inside the mould the longer the moulding process is slowed down. In fact it is only when the mould is freed from the preforms that it can be utilised for the next cycle.

It should be borne in mind that the complete injection step consists of the closure of the half moulds, the injection of the resin fluid into the cavities, the cooling of said resin and the solidifying of the respective preforms to allow their handling, the opening of the half moulds and the extraction of the preforms. This step, which directly influences the yield of the plant engaged in manufacture of containers, has a longer duration than all the other subsequent operating steps of the plant and yet is difficult to shorten, therefore a way is particularly sought to reduce the cooling period within the mould and to substantially allow cooling of the preforms after they have been extracted from the moulds.

With the increase in productivity of plants producing bottles and other types of plastic containers there has arisen an ever stronger need to produce moulding machines, whether single or two stage, wherein the moulds are involved in injection and cooling operations for the least time possible.

State of the art moulding-blowing plants are trying to achieve this, extracting the preforms as soon as possible after the injection process and making them spend the cooling steps in special cooling plates provided with cups. There exist well known cooling plates which provide means for the forced cooling of the preforms using the circulation of cooling fluids.

On the cooling plate there are provided a number of cups which generally have a shape complementary to the external one of the preforms and on which the cups are held in position and cooled by a recirculating system of cooling liquid. The advantage of the use of such cups lies in the fact that the deformation of the preform structure during the cooling of the plastic is almost eliminated.

Another means utilised to even further accelerate the productive moulding cycle in established moulding-blowing plants is to provide on the cooling plate cooling cups in multiple numbers, for example multiples of two or three, over the number of moulding cavities present in an injection mould. In this way, whilst within the mould there takes place the injection of a determined cycle of preforms, the preforms from preceding cycles already extracted and held in the cups of the cooling plate, are undergoing the cooling process. Thus, by selecting appropriately the number of cups, the cooling step can be made to last about two or three times more than the necessary injection time in the mould. An injection moulding plant of the type referred to above is described in the patent application IT-PN2000A000006.

This plant is somewhat complicated to manufacture and to manage. Furthermore it involves a big number of components which make its construction and maintenance costly.

SUMMARY OF THE INVENTION

The present invention has as its objective a device for injection moulding of preforms, or for containers in general, which overcomes the disadvantages described above, producing a simple and reliable device which can reach a high productivity level and which is economic to manufacture, to manage and to maintain.

Another objective of the present invention is to provide a moulding process for containers, particularly bottles, of plastic material adapted for high speed lines of bottle production, which is simple to carry out.

These objectives of the present invention are achieved, from a first aspect of the invention, using a moulding device for plastic material objects which provides an injection mould comprising two half moulds designed to define, in its closed position, a group of injection cavities for said objects, wherein the said half moulds possess a reciprocal distancing and nearing motion defining a closed and open position, an arm for extraction from the mould of said objects provided with reversible grasping elements for the said objects, provided with a translating movement between a first insertion position in the space between the said half moulds when they are in their open position and a second position outside the half moulds, a cooling turret provided with two sides positioned opposite each other, each side comprising a plurality of cups for the conditioning of said objects and designed to hold such objects, the turret being supported by means which allow it to effect a first rotational movement around a substantially horizontal axis and a second vertical translatory movement between a first higher position underneath the extraction arm and a second lower position where the device comprises an extraction table of the objects, which is equipped with gripping parts to extract the objects from the cups of the turret and which is situated underneath the above mentioned second lower position of the turret.

According to another aspect of the invention the above mentioned objectives are achieved using an injection moulding process which has the features of claim 6. Preferred alternative embodiments of the invention are described in the dependent claims. Further objectives and advantages of the present invention will become more apparent by means of the following detailed description, relating to preferred embodiments, but which absolutely do not exclude possible further alternative embodiments and improvements.

DESCRIPTION OF THE FIGURES

FIG. 11 represents an outline lateral view of the plant in FIG. 1 in a ninth operating stage;

FIG. 11a shows an enlarged detail of FIG. 11;

FIG. 13a shows an enlarged detail of FIG. 13;

FIGS. 15a), b), c), d) show views and sections of another enlarged detail of the plant according to the present invention;

FIGS. 16a), b), c), d) show views and sections of another enlarged detail of the plant according to the present invention;

FIGS. 17, 18, 19, 20 show plan views of the functioning diagram of the part in FIG. 16 in four different operating stages;

DETAILED DESCRIPTION OF THE INVENTION

Figure 1:
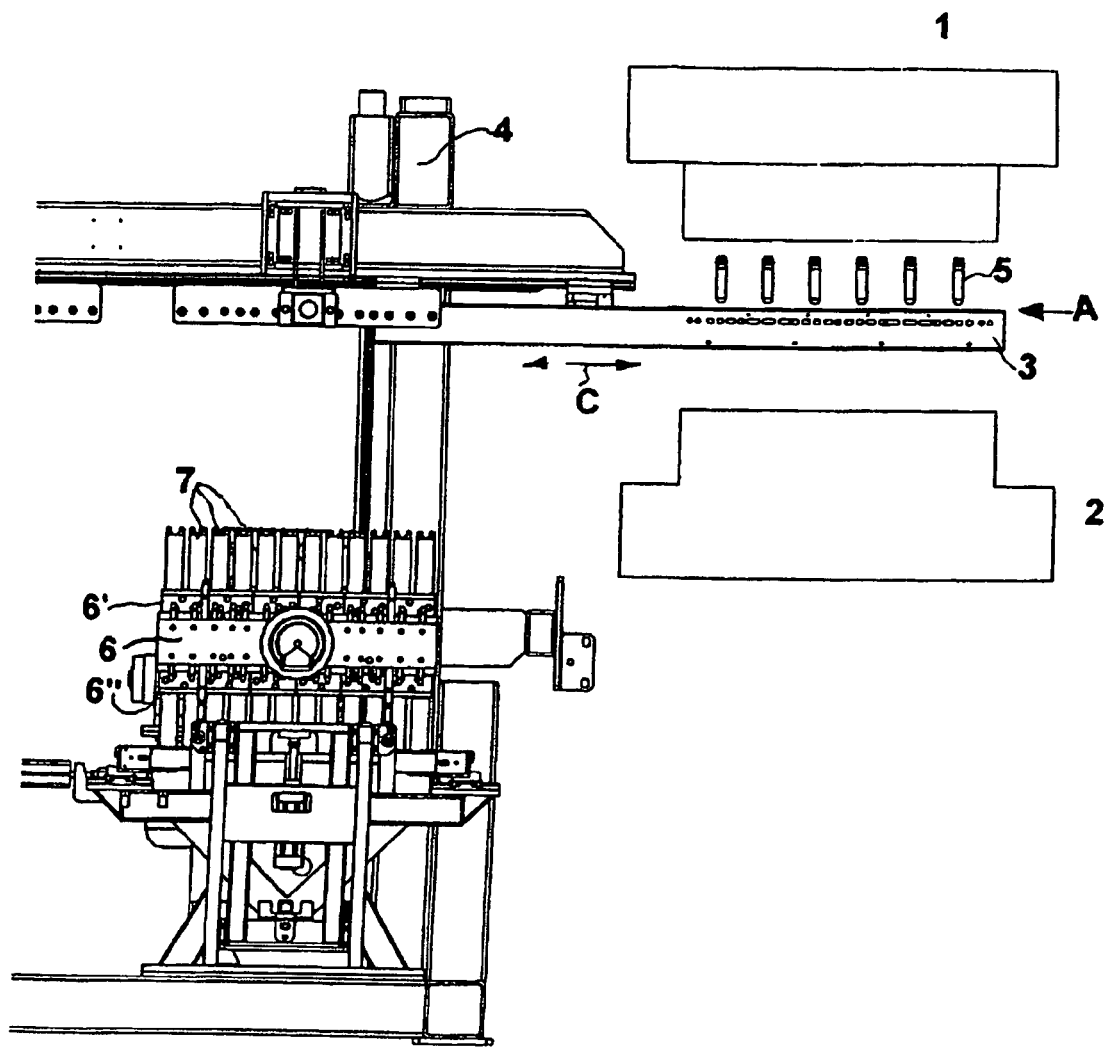
FIG. 1 shows a side view of the plant according to the present invention in a first operating stage.

According to the present invention and with particular reference to the Figures the moulding device for preforms according to the invention consists of an injection mould of an known type consisting in turn of two half moulds 1, 2, driven by a press, which in the closed position of the mould define a group of injection cavities, not illustrated in detail in the Figures. The device provides a load bearing structure 4 which supports a collection and transfer element, that is an extraction arm 3, provided with a translatory movement in the direction of arrow C, so as to make it enter the space vacated by the two half moulds 1, 2 at the end of an injection cycle. The extraction arm 3 is able to receive the preforms 5 which are released in a known manner from the higher half mould, by the driving action of a guillotine-like mechanism not illustrated in detail in the Figures. This operation is effected during the course of the insertion movement of the extraction arm 3 inside the space left free between the half moulds 1, 2, following which the preforms 5, after the injection operation, are extracted from the area around the mould and are received in special seats. The function of these seats is that of intercepting the preforms 5 released from the half-mould 1 using the proper gripping members standing above the arm 3, leaving them to fall by gravity and to collect them in a tidy way, positioning them in a vertical direction, that is with the neck upwards. After which they are transferred above the rotating turret 6 and finally left to drop again by gravity into the respective cups 7.

The guillotine-like gripping system contained in the extraction arm 3 permits to support the preforms during the transfer movement from the space between the half moulds up to the insertion zone in the cooling turret 6 and to release them with a simple deployment operation. The extraction arm 3 is equipped with seats for the preforms distributed in rows and distanced in such a way as to exactly correspond with the predetermined position of cooling cups 7 of the turret 6. Each row of seats of the arm 3 is therefore able to position itself above a respective row of cups 7 in the rotating turret 6. That allows the arm 3 to refill in successive cycles all the cups 7 situated on the sides of the rotating turret 6, discharging from time to time a successive load of preforms 5 on a different group of cups 7, with the arm 3 simply moving and stopping in the proper position in such a way that the distribution geometry of the seats matches exactly successive geometries of the sides 6', 6" of the rotating turret 6. The locking device of the arm 3 consists of two plates: a higher centering plate 40 of the neck which is provided with a predefined number of holes with a diameter a little greater than that of the neck of a preform and a second mobile lower plate 41 which is the proper guillotine-like device, with a number of slotted apertures of width less than the diameter of the neck terminating with a hole which instead is of a diameter greater than the neck of the preform. The second plate 41 is selectively sliding against the first higher plate. The slotted apertures consist each of a first part, the section of which allows the passage of the body of the preform, but not of the neck, and of a second part, the section of which allows the passage of the whole preform, that is even of the ring of greater diameter situated at the base of the threaded neck.

Preferably, to facilitate the interception and centering of the falling preforms the highest part of the holes in the upper plate 40 is flared towards the top in the form of a truncated cone.

As regards the rotating turret 6, its function is to reduce the temperature of the preforms which exit from the injection press. This is achieved by a body in the form of a paralleliped on which are situated two opposite sides 6' and 6", on each of which is fixed an equal number of cooling cups 7. Although the description refers to an alternative embodiment in which the turret is provided with cups on two opposite sides, it is possible to arrange alternative embodiments consistent with the present invention in which the cups are set out only on one side or on a number of sides greater than two, for example three or four. In this case the shape in section of the turret will correspond to that of the corresponding geometric figure. These solutions can be advantageous for other hourly yields of the mould or for other dimensions of the preforms.

Figure 14:
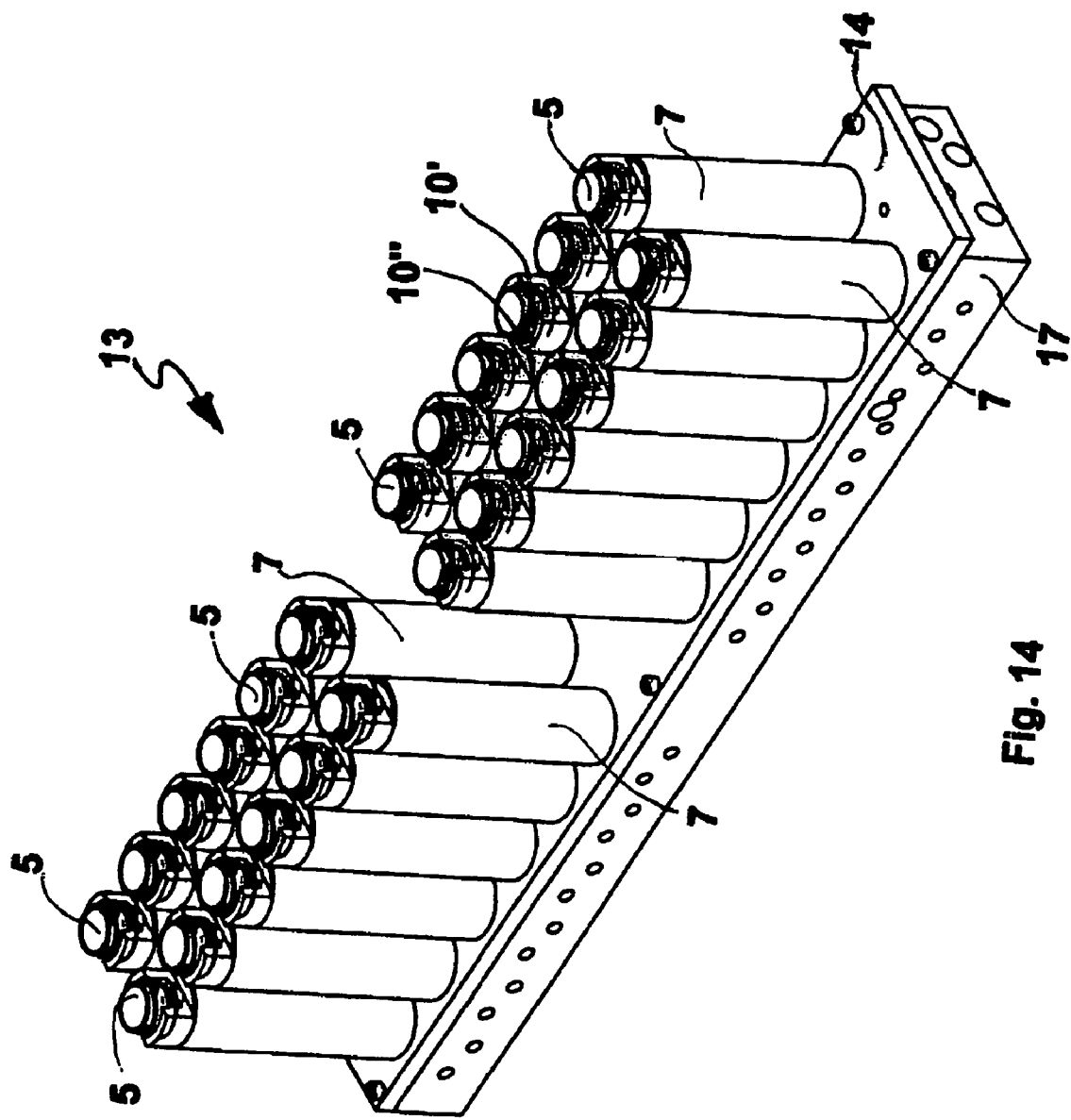
FIG. 14 shows an enlarged axonometrical view of a detail of the plant according to the present invention.
Figure 21:
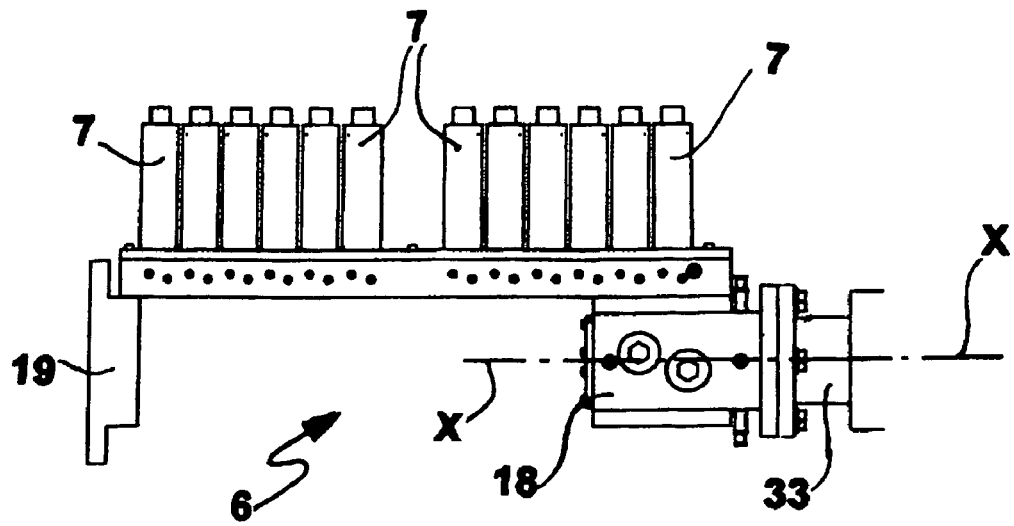
FIG. 21 shows a lateral view of an enlarged detail of the plant according to the present invention.
Figure 22:
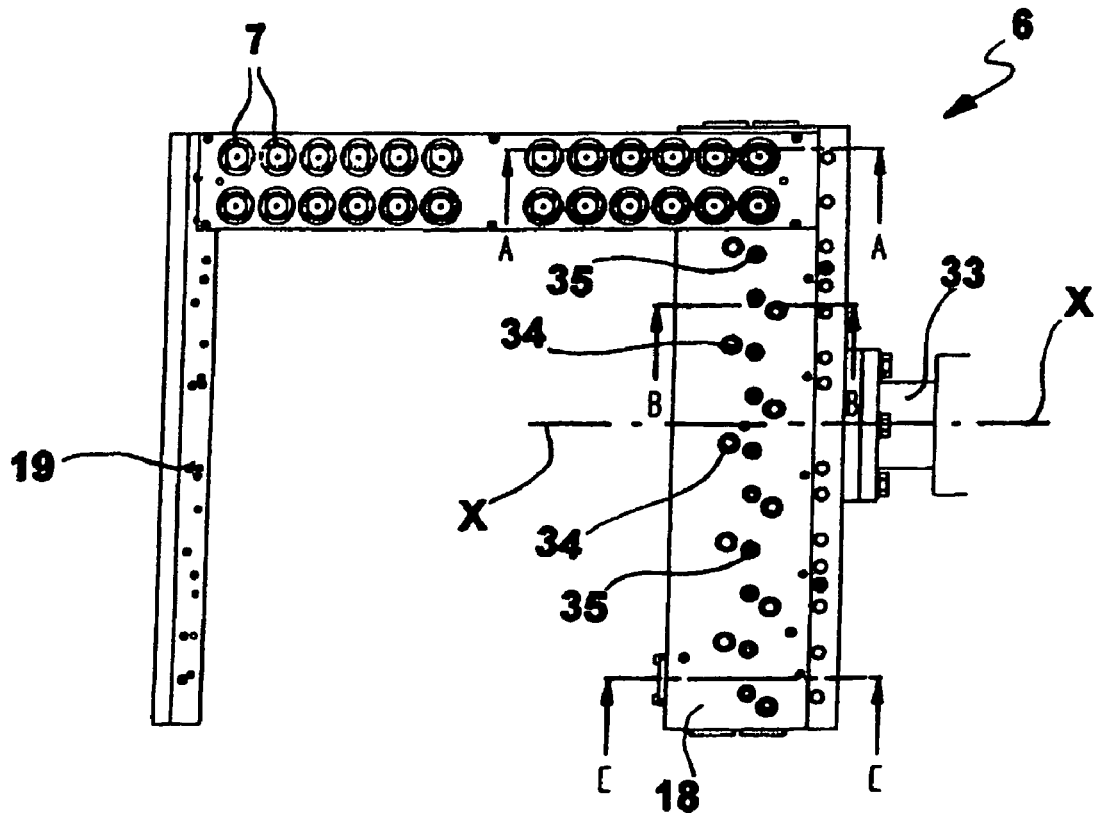
FIG. 22 shows a plan view of the detail in FIG. 21.
Figure 23:
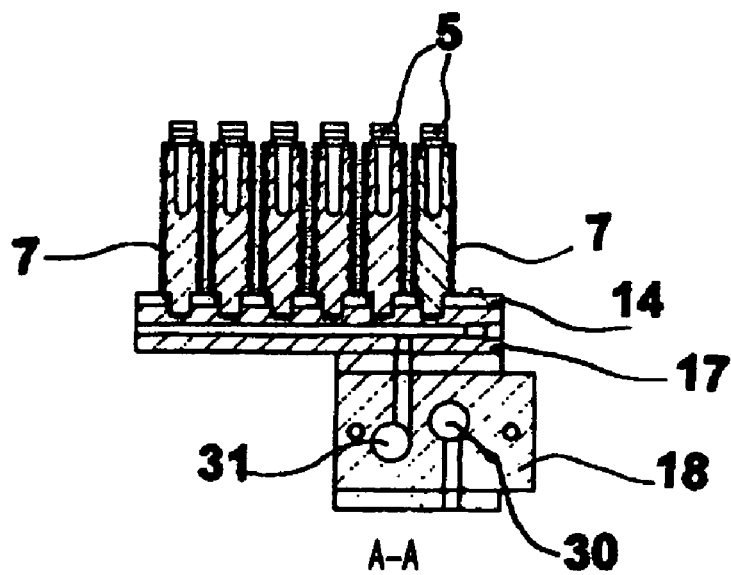
FIGS. 23, 24, 25 show respective views in section according to various plans of the detail in FIG. 21.
Figure 24:
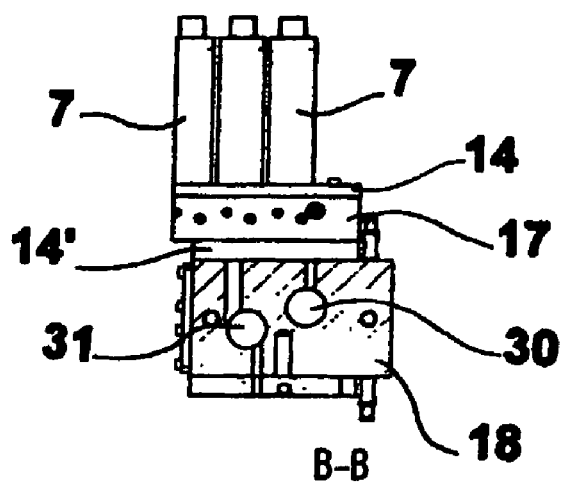
Figure 25:
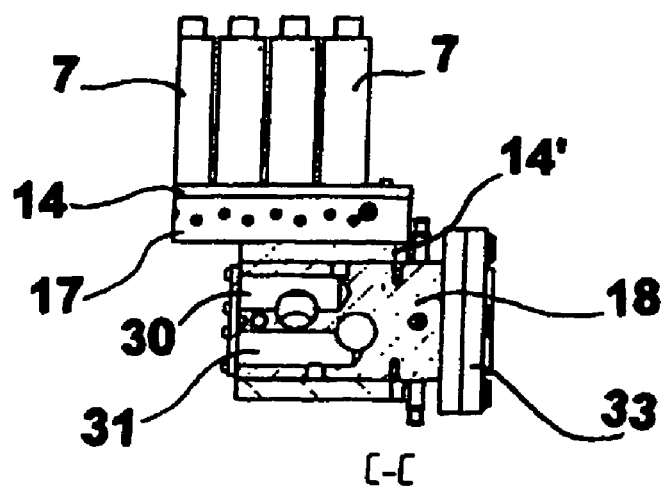

Each preform is held individually in a respective cup 7, and these cups are selected in accordance with the preform produced because they match perfectly the exterior profile of the preform. A preferred embodiment of the cups 7 consistent with the invention is shown in detail in particular in FIGS. 14 and 15.

Within the cup are advantageously foreseen, but not necessarily, means of lateral containment of the preforms 5 in the respective cups, for example containment surfaces or guides 10', 10" of the ring enclosing the threaded part of the neck, the so called ring 9. These guides serve to contain and/or reduce through contact the radial movements of the open end of the preforms 5 due to thermal deformations as for example those deriving from preceding movement operations. The guides 10', 10" are set symmetrically with respect to a meridian plan of the cup and extend in a longitudinal direction in the cup itself. Without departing from the scope of the invention the guides can also be produced in a single part, which clasps the open end of the preform with a sufficient winding angle, or in a number greater than two.

The guides 10', 10" are fitted in such a way as to define, on the inside of the cups, surfaces of lateral support against which the open end of the preforms 5 can support itself laterally, that is in radial direction, with reference to its deformation.

Clearly a person skilled in the art will determine the shape of the internal cavity and of the lateral support surfaces from the geometry of the preform, or he will determine both so as to adapt one to the other. The support surface(s) is(are) fitted and sized in such a way that between it (or them) and the support section of the preform, selected for contact, there is interposed at least a minimal radial gap, or even a maximum radial interference, of predetermined value.

Alternatively the internal contact surface(s) of the guides can be parts of a flared or truncated cone surface which opens towards the exterior of the cup, to take account of the thermical reduction of the diameter, for example of the ring 9 or other contact zone of the open end.

The entrance surface of the guides can produce an ample flaring which opens towards the exterior, in such a way as to constitute an invitation to the preforms which are inserted into the cups.

The above mentioned devices also provided for the straightening of preforms 5 already deformed by the heat of a preceding automatic handling, for example by transferring them from the injection mould to the cooling cups.

In a second type of preferred embodiment the containment surfaces 10' and 10" are machined by the external sleeve 44 instead of by the internal body 45. This second embodiment is more simple to produce and can be mounted on an existing internal body and without extended containment surfaces 10' and 10"; furthermore it can produce in a simple way a changed format of the preforms, in the sense that changing the external sleeve 44 an internal body 45 can house preforms with rings 9 of different diameters.

In correspondence with the external surface 31 of the cup the two guides 10' and 10" are cut laterally along two axial and parallel planes so as to form two spaces of passage 42, 43 at the sides of the guides 10' and 10". After the insertion of the preform 5 these spaces of passage define a distance H between the end surfaces 31 of the cup and the ring 9 of the preform.

Alternatively the means of containment of the preforms 5 in the respective cups can be attained through an air suction system in the area between the base of the cups and the top of the preform through a channel 8, or by a combination of the two systems. This permits the turret 6 to perform a rotation through which, when one of the sides 6', 6" is positioned upside down, the preforms 5 situated in the cups of that side do not fall out of the cups 7 because they are subject to either the force of gravity or the centrifugal force due to the rotation of the turret. The rotation of turret 6 around the horizontal axis X, orthogonal in the direction C, allows the two opposite surfaces 6' and 6" to exchange alternatively the position of each side, placing them in turn upwards or downwards, facing conveniently geometries of empty cups 7 with preforms 5 transported by the extraction arm 3. In advantageous alternative embodiments of the invention it is possible to identify other spatial positions for axis X of the turret and which are not on the same plane as direction C.

Cooling is obtained in a known way, for example through the circulation of water at low temperature around each cup along channels 11, 12. The cups can also be utilised, in a known way, in the more general function for the conditioning of the preforms. Each of the wider sides of the turret 6 is provided with a plurality of cups 7 arranged in such a way and in such a number that they can be collected, according to a group of separate distribution geometries, geometrically identical, which can simultaneously be housed on the same side. Each of the faces is covered with a series of similar groups 13, shown in enlarged detail in FIGS. 13, 14, 21 and 22, for example in the form of rectangular and square plates on which the respective cups 7 through the insertion of an end section 15 suitably shaped in a hole of a complementary form machined on the plate 14 can be fixed.

The rows of cups 7, on which the geometries are based, are preferably arranged each parallel with the other, although other dispositions can be used and moreover the whole area of the sides of turret 6 is taken up by the plates 14 placed side by side and by the respective cups 7.

The plates 14 are situated one alongside the other in a necessary number to satisfy planning needs relative to the dimensions of the cooling turret 6, bearing in mind the size of the cups which is linked to the diameter of the preforms. In fact the bigger the preforms are, the more limited is the number of cups which are positioned on each side 6', 6". The dimensions of the plates 14 are based on the number and/or the diameter of the cups 7 which must be housed there, it being advantageous to have a modularity of the components of the rotating turret 6. In this way the substitution of the cups 7, when it becomes necessary to change them for the production of a series of plastic containers of different dimensions, proves much quicker and simpler. Furthermore the production cost of the turret 6 is more economic compared with that of other state of the art turrets.

A further advantage of the arrangement envisaged by the invention is that the plates 14 constitute mainly an element of linkage and mechanical support between the cups 7 and lead to a simpler construction, with it not being crossed by circuits for water, air or for vacuum purposes.

The plates 14 are supported at a first of their ends by a bar 18, in the form of a paralleliped, which, apart from supporting the plates 14, collects the channels necessary for the operating of the cups 7 to carry out the functions envisaged for conditioning of the preforms. This substantially consists of channels and of manifolds 30, 31 for the supply and evacuation of the cooling liquid and of the air channels of the pneumatic system for the suction of the preforms in the cups and optionally, in alternative embodiments of the invention, for the blowing of the air which acts to assist the extraction of the preforms from the cups by simultaneously driving the external mechanical extraction means described later herein. Other functions can be inserted into the bar 18 if considered necessary. With the aim of facilitating the substituting operations of the plates 14 when the dimensions of the cups vary, on the bar 18 there can be provided holes 34, 35 in excess of the number effectively required, set in appropriate positions corresponding to different configurations of plates 14. In arranging plates 14 for a particular dimension of the cups, some of the holes 34, 35 are situated so as to link with the channels used for the work fluids whilst other holes are blocked up using stoppers not illustrated in the Figures as they are not necessary. In the case that the plates 14 are replaced to house cups 7 of other dimensions on the turret 6, the holes that were used in the previous case are blocked and those holes 34, 35 which in the preceding case were blocked are linked with the fluid channels which serve the cups. This solution thus permits the use of a single bar 18 for a very wide range of cup dimensions.

The plates 14 are supported at another of their ends by a second bar 19 the shape being essentially that of a parallelopiped. If necessary this bar 19 can also accommodate service parts of the turret, in further alternative embodiments of the invention. The bar 18 acts also as a structural link with the support element 33 of the whole turret and which also controls the rotation along the axis X and the vertical translatory movements. If necessary the plates can also be supplemented with more plates of the same shape joined together, for example for reasons of rigidity or of design choices.

As a result the turret 6 is very light because there is an absence of parts occupying its central area which remains empty. Its construction is as a result simplified and it appears in modular form making the replacement of the groups 13 of cups easier and swifter, whilst in plants of known type the rotating turret 6 has to be replaced in its entirety whenever cooling cups have to be substituted for whatever reason.

In the invention's injection moulding device for preforms there are also provided means of command and control, not described in detail, for the functioning of the device and the carrying out of the injection moulding process, which at each extraction of preforms produced in an injection cycle positions the arm 3 in the location corresponding to that of selective superimposition for the cups to occupy on the external sides 6' and 6" of the turret 6. Thus the preforms released from arm 3, by actuating the guillotine-like mechanism, fall by gravity into the cups 7 of an external side 6' or 6".

The rotating turret 6 is provided with motors that actuate the rotation, of a known type and not illustrated in detail in the Figures.

The rotating turret 6 has the possibility of rising and/or descending, essentially vertically in a controlled way: the external sides of the turret, which have to receive the preforms 5, must be as near as possible to the respective seats of arm 3 in order to assure an exact centering and insertion of the preforms 5. A distancing downwards from the arm 3 of the turret 6 allows it free rotation, without its interfering with the arm 3 standing above or also simply with the preforms 5 projecting downwards.

The moulding device, according to the invention, envisages extraction means able to release selectively the preforms 5 inserted in the cups 7 at the moment when the cooling has reached the predetermined temperature. Generally it is the temperature at which the plastic has a structural hardening that it is possible to further transfer the preforms to a successive stage of the production process, however the temperature is selected expediently based on the production process.

These means of release are illustrated in detail by referring to FIGS. 16 to 20. They are formed by a support structure 20 which bears a table 21 using a regulation device rising from the ground 22. This device is advantageously provided with a security system in case of emergency or a motor fault, for example whenever the turret does not stop at the proper height and pursues its running downwards. The table 21 is supports on its upper side a plate 23 provided with a series of longitudinal slots 26 set in parallel one opposite the other and essentially occupying the useful surface of plate 23. The plate is equipped with suitable means, such as guides, not illustrated in detail in the Figures, designed to permit its running in the direction of arrow D in both directions with respect to the fixed table 21, attached to the ground or simply to the structure of the moulding plant. The generation of the translation movement of the plate 23 is achieved by means of a motor 24, or by other equivalent pneumatic, hydraulic or electrical means, which is able both to position the plate 23 in its movement and to maintain it also in some intermediate position for the time deemed necessary to carry out the extraction operations of the preforms.

These slots are advantageously of the type passing through the plate 23 so as to permit the preforms involved in extraction from the cups of the turret to fall downwards and to pass also across the table 21 provided with a suitable opening in the central part in correspondence with the area in which the preforms are extracted from the cups of the sides 6', 6" of the turret 6, permitting their fall onto a conveyor belt or into a suitable container, not illustrated as concerning well known parts in the art. In correspondence with the edges of the slots the thickness of the plate 23 is selected in such a way that the edges of the slot in the sections or teeth 29, 30 can engage the rings 9 of the preforms inserting themselves in the cuts 42, 43 defined between the extreme side 31 of the cups 7 and the ring 9. The extraction teeth 29, 30 can be carried out on the plate 23, also on bars 32 or similar back up elements, fixed to the plate 23 using screws 36. Other solutions are also possible without departing from the scope of the invention.

The thickness of the plate 23 is chosen in such a way that the edges of the slot can engage the rings 9 of the preforms without the cuts 42, 43 carried out on the extreme edge of the cups 7, at the base of the containment parts or guide 10', 10", having to have too great a height H. The geometry of the slots 26 present on the plate 23 which can be seen in plan view in FIG. 16*a*) is better understood from the way it is illustrated in FIG. 17 which refer only to a portion of the plate 23, for example a third or a half, but which however describes in the optimum way the geometry of the slots throughout their length. In the illustrated embodiment reference is made to the case where on the cooling turret there are, for each side, a number of cups three times superior to the number of cooled preforms which are extracted from the turret on each extraction cycle. This also corresponds to an overall number of cups on the turret six times superior to the number of preforms produced in each moulding cycle of the mould. In this alternative embodiment there are represented in particular with fine diagrams the tracks of the rings 9 of the preforms 5 in the positions in which the cooling turret is advancing the preforms to the extraction plate 23, with the aperture turned downwards. The slots 26 have along their longitudinal extension a group of sections 29, 30 which mark constrictions of the slots 26 at predetermined distances, that is defined also as teeth. These moreover having a group of sections 27, 28 with width slightly superior to the diameter of the ring 9 of the preforms, spaced from the smaller sections 29, 30, so as to allow the introduction of the preforms inside the slots 26 for a section sufficient to arrange the common plan defined by all the rings 9 of the preforms 5, when they are held in the cups 7 of a side 6', 6" of the turret 6 at such a level that the constrictions of the slots or teeth can seize the rings 9 inserting themselves in spaces 42, 43.

Figure 8A:
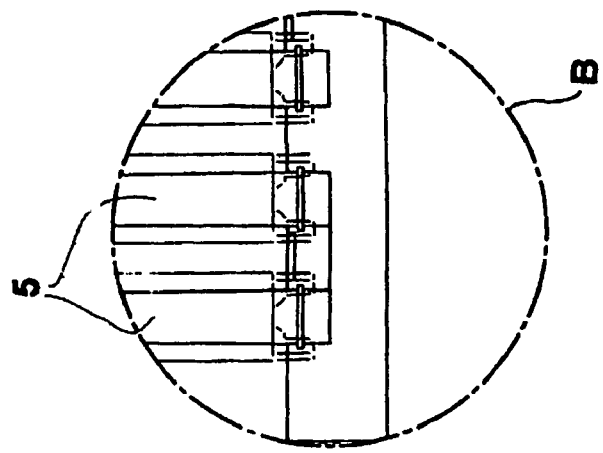
FIG. 8a shows an enlarged detail of FIG. 8.
Figure 9:
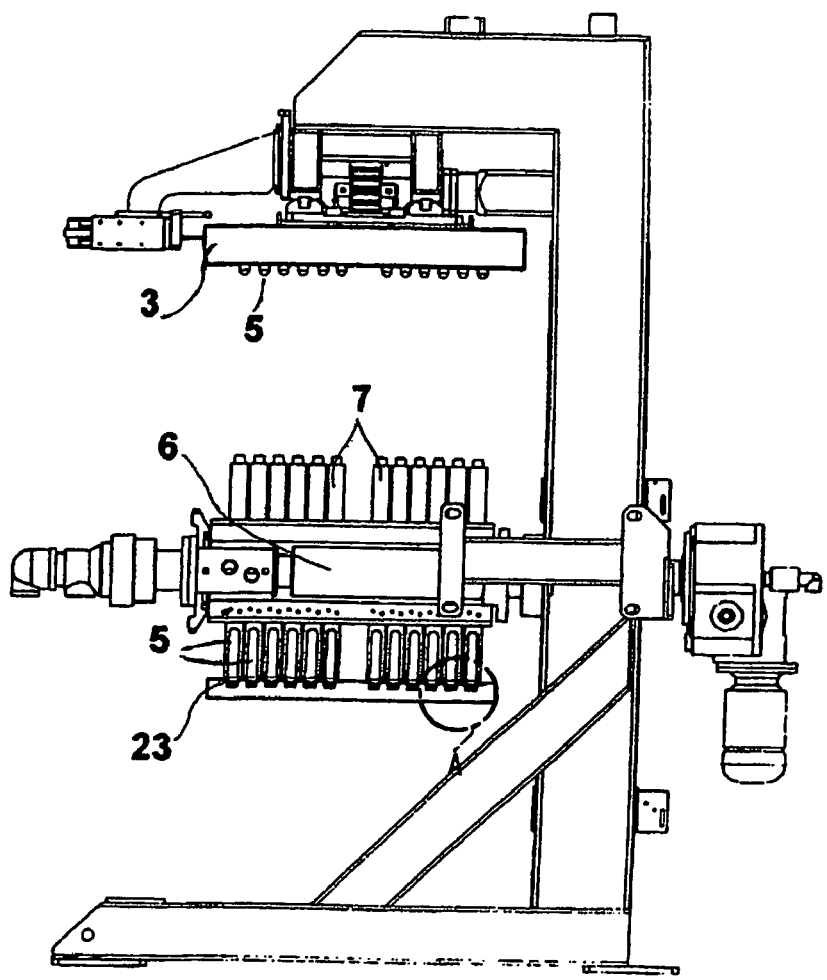
FIG. 9 shows a side view of the plant in FIG. 1 in a seventh operating stage.
Figure 9A:
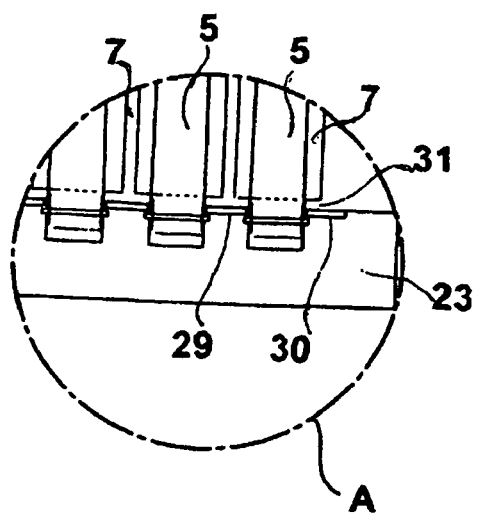
FIG. 9a shows an enlarged detail of FIG. 9.
Figure 10:
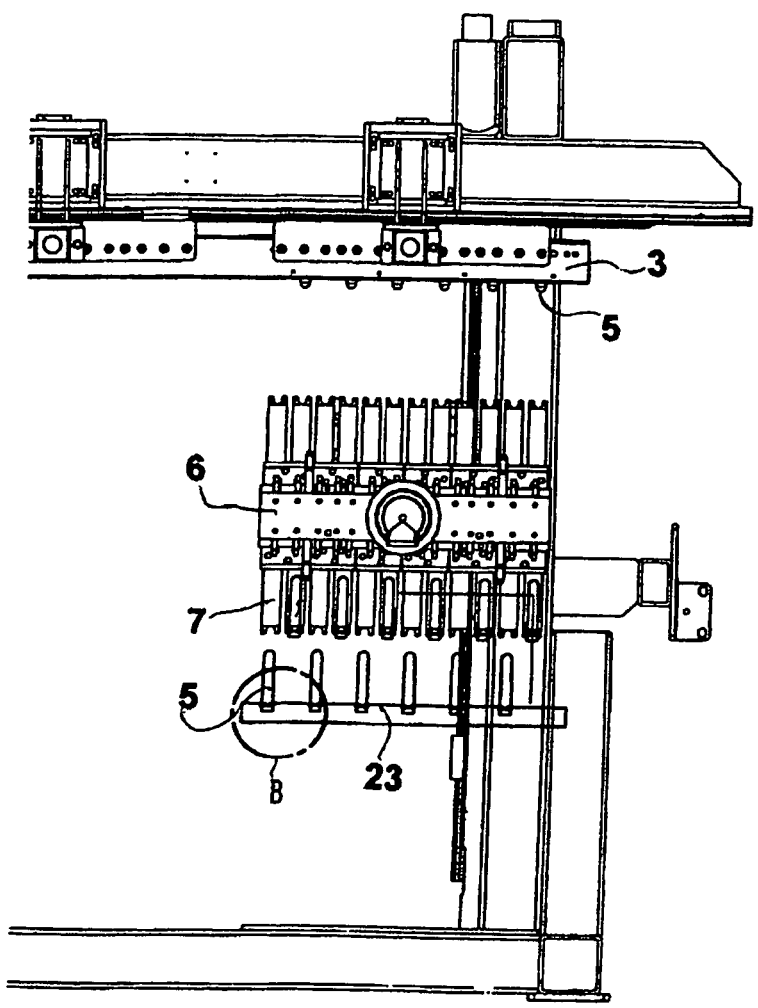
FIG. 10 shows a side view of the plant in FIG. 1 in an eighth operating stage.
Figure 10A:
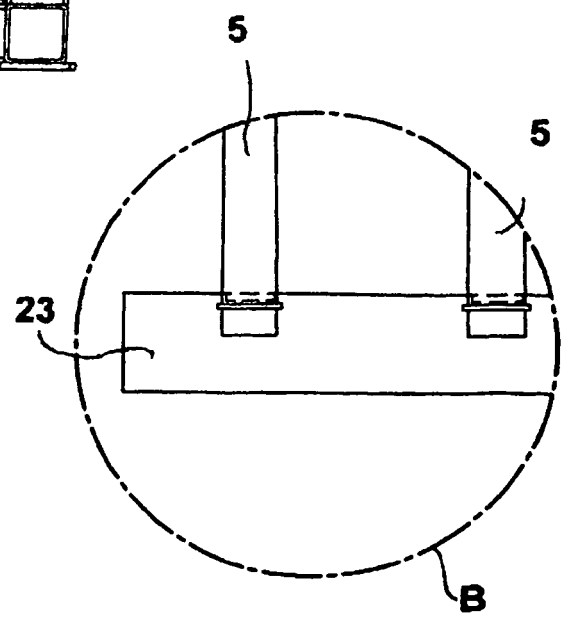
FIG. 10a shows an enlarged detail of FIG. 10.

In the present example the plate 23 for the extraction of the preforms from the cups 7 foresees the extraction of one preform from each group of three preforms during each extraction cycle. However the length of each wide section 27, 28 permits the passage of a group of three preforms together, in the lowering operation of the turret 6 onto the plate 23. During the translating operation of the plate 23 in the direction of the arrow D of a section equal to the distance between the axes of two adjacent preforms, the teeth 29, 30 situate themselves in the free space between the rings 9 and the end surfaces 31 of the cups and wherein they engage the rings 9, as shown in FIG. 9a, whilst the FIG. 8a shows the teeth 29, 30 in a disengaged position, while FIG. 10a shows the teeth engaged and ready for the extraction operation of the preforms. Raising the turret 6 moving it away from the extraction plate 23, the teeth 29, 30 hold a number of preforms, that is one every three present on the side of the turret 6, whilst the other two preforms from each group remain in the respective cups to continue the cooling cycle. Once completely exited from the respective cup 7, the preforms 5 fall downwards through the apertures provided in the table 21. The plate 23 is again translated a distance equal to the interaxes between two cups 7 in order to permit the passage of groups of three preforms into the spaces 27, 28. Then a cycle of this type is repeated each time the turret is lowered towards the extraction plate and each time the plate 23 is translated in the direction of arrow D and for the distance necessary for the teeth 29, 30 to engage those amongst the preforms that have completed the cooling process in the cups. These steps are illustrated in detail in FIG. 17, wherein the entry position of the preforms into the extraction plate 23, is shown and FIG. 18 shows the position of the extraction plate 23, while clamping the preforms of the row towards the left, as compared to the position illustrated in the Figure, and of all the spaced rows of three cups from the first. FIG. 19 shows therefore the unloading position of the preforms of the second row after the first and of those spaced rows of three cups, and FIG. 20 that of the unloading of the third row and of those spaced rows of three cups. For the extraction of the preforms 5 from the cups 7 it is also possible to foresee the lowering of the plate 23 as an alternative to the rising of the turret 6 or it is possible to also provide a combined movement of the lowering of the plate 23 and of the rising of the turret 6. It is possible, without departing from the scope of the present invention, to provide the extraction means with table 21 and the plate 23 in a vertical or oblique position in an appropriate area of the mould where it can however interact functionally with tower 6. Also in this case the extraction movements occur through relative reciprocal distancing of the turret 6, the table 21 and the plate 23. In this alternative, if necessary, behind plate 23, guiding means for the preforms which are extracted from the cups to facilitate their fall or their conveyance elsewhere outside the mould area could also be provided.

Obviously the plate can be suitably prepared so as to act on groups of two preforms on each extraction cycle from the cups 7, corresponding with the briefer cooling cycles in the cups, or on groups of four preforms, corresponding with the longer cooling cycles.

There follows a description of the production process of preforms using the injection of objects in plastic material consistent with the invention, with reference to Figures from 1 to 12 and from 17 to 20 which illustrate in outline and in succession the moulding steps of the preforms 5 carried out using the injection device already described above.

Figure 2:
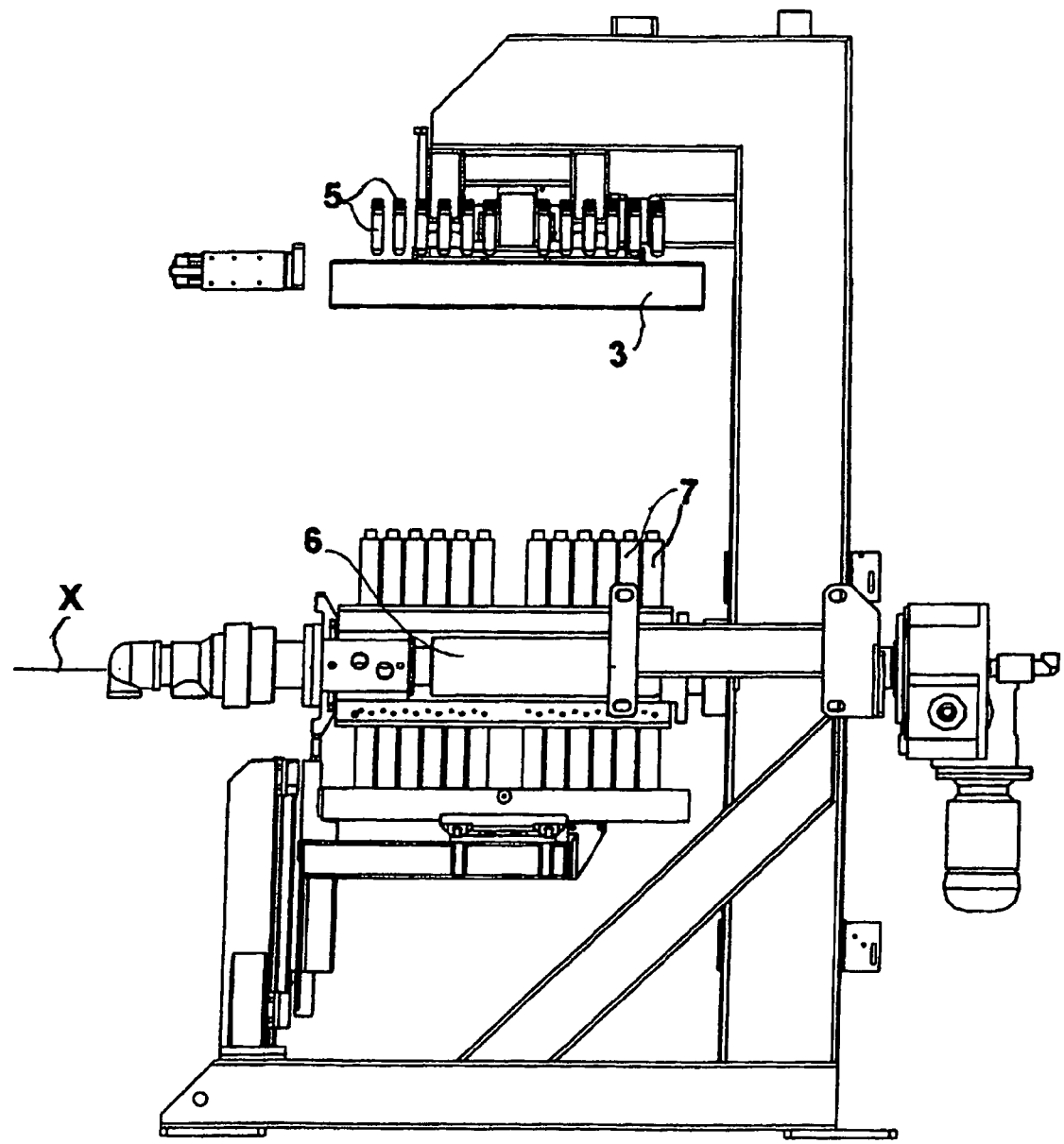
FIG. 2 shows a side view in the direction of arrow A of the plant in FIG. 1.
Figures 3, 3A:
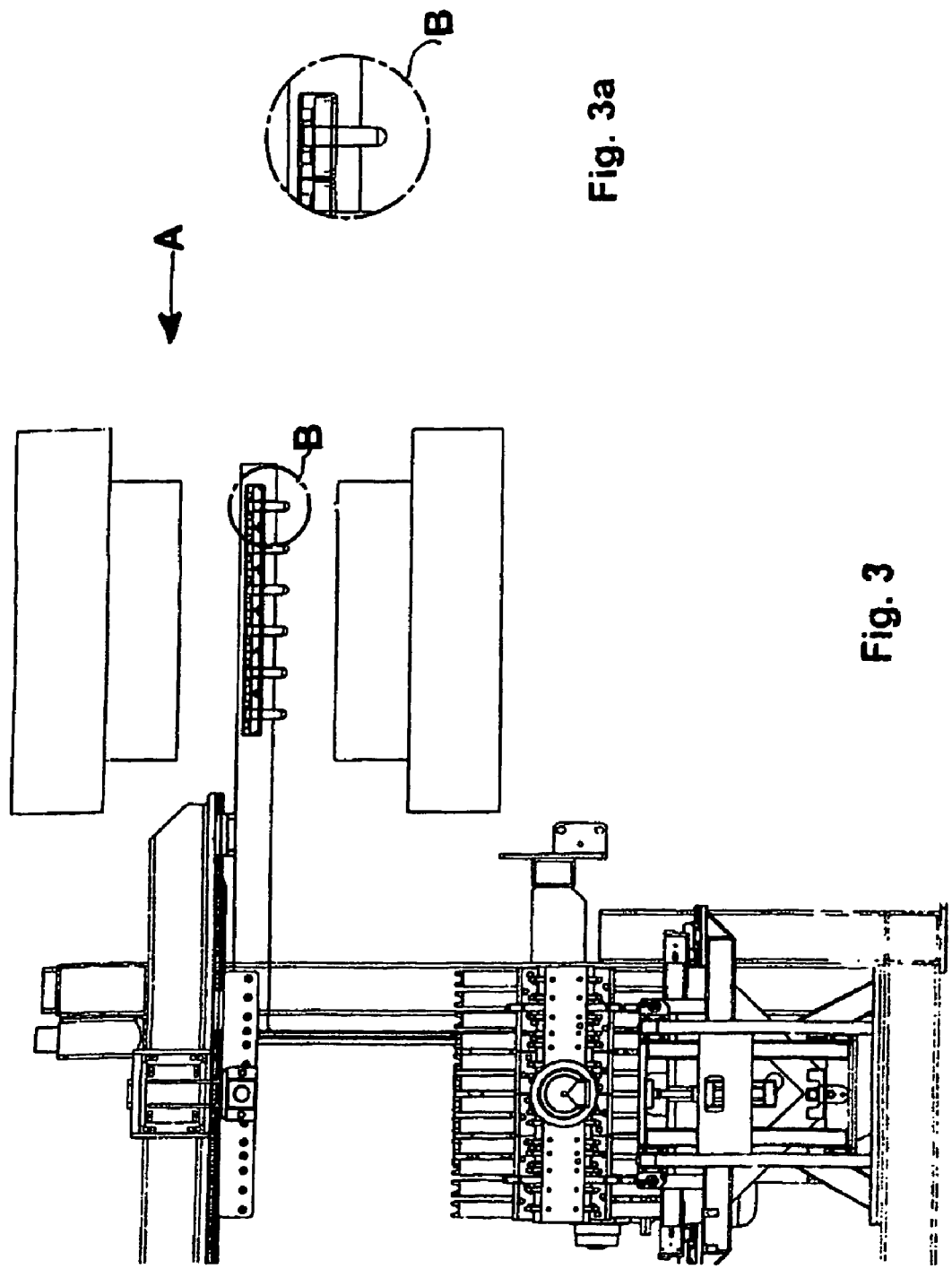
FIG. 3 shows an side view of the plant in FIG. 1 in a second operating stage.

The first step, illustrated in FIGS. 1 and 2, foresees that the preforms 5, having been just injected into the mould, are released by an injection half mould and fall by gravity onto the arm 3. Here the preforms are retained because in the guillotine-like mechanism 40, 41 in a first position, only the body of the preform can pass through, but not the neck, due to the presence of the ring 9 which has a diameter size that does not allow the passage of the neck, FIG. 3 and enlarged detail of FIG. 3a).

Figures 4, 4A:
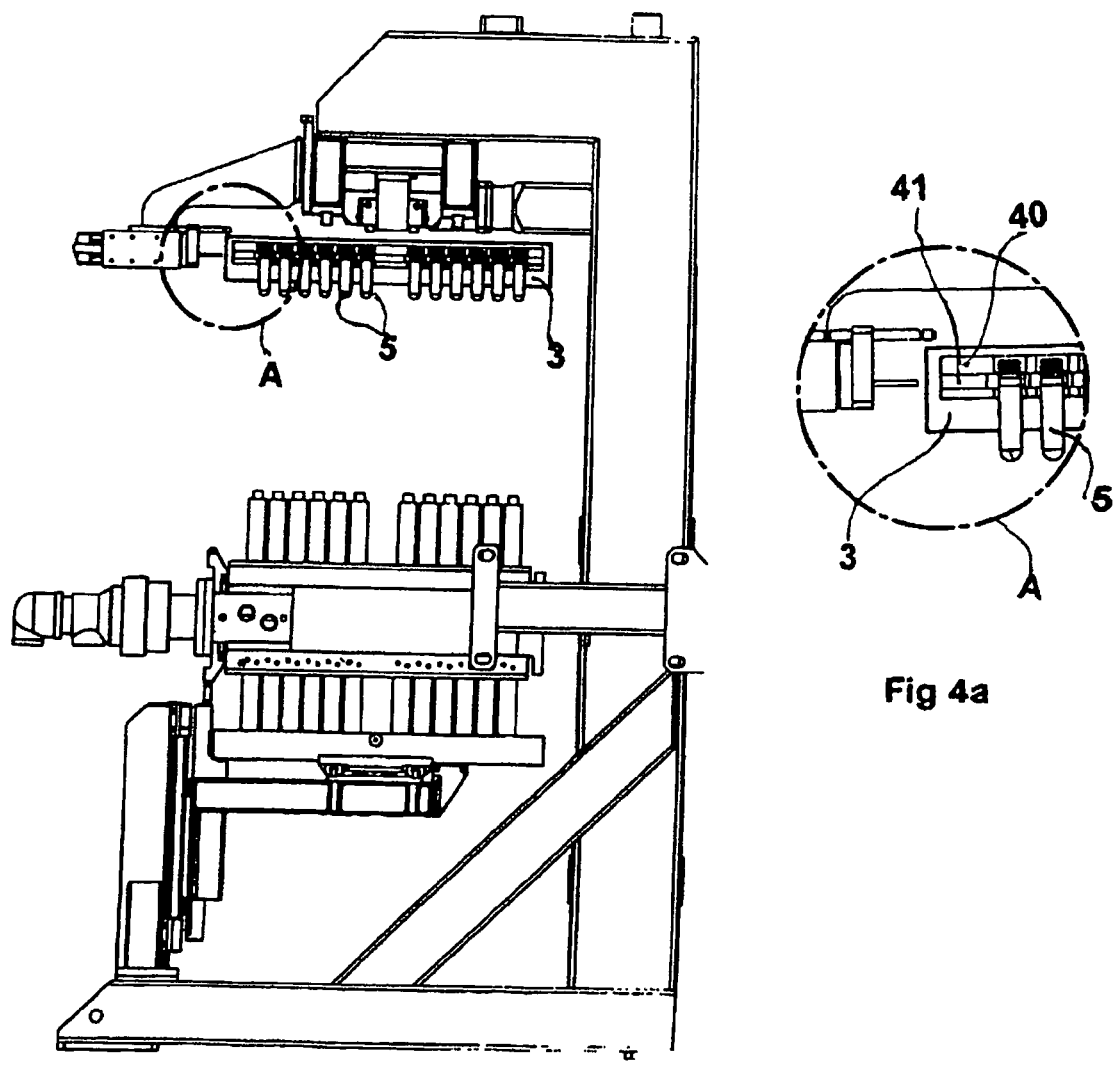
FIG. 4 shows a side view in the direction of arrow A of the plant in FIG. 3.

In the following step, FIG. 4, the arm 3 is translated above the rotating turret 6, which presents one of the sides 6', 6" in a horizontal position and with apertures of the cups turned upwards, and exactly in the position in which the distribution geometry of the arm 3 superposes itself vertically on one of the distribution geometries which are three in this embodiment, although a different number is possible, as a function also of the time the moulding and cooling cycles require. During the translation the preforms 5 are held laterally either by the guillotine-like mechanism 40, 41 or by the centering of the neck.

Figures 5, 5A:
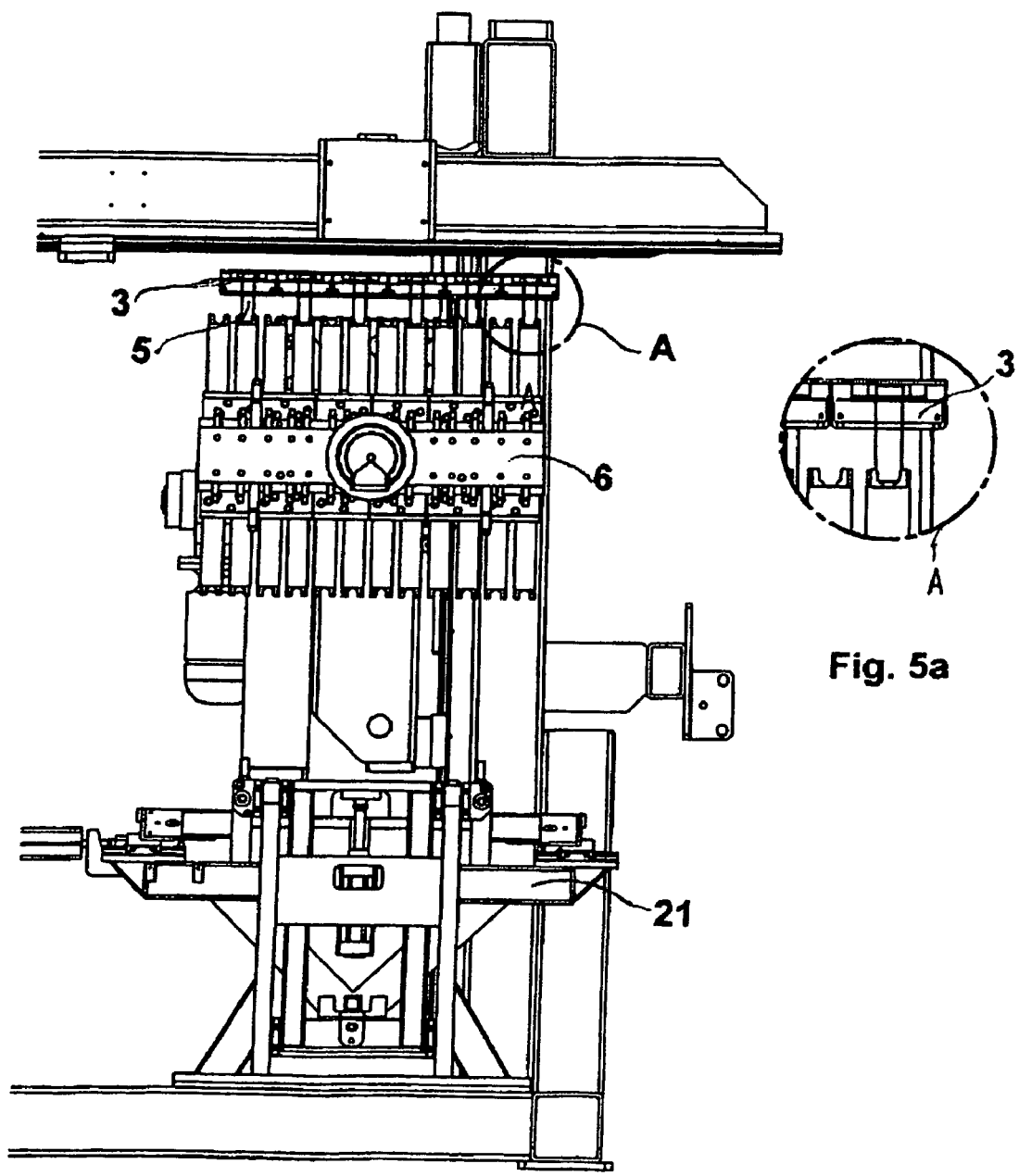
FIG. 5 shows a side view of the plant in FIG. 1 in a third operating stage.
Figure 6:
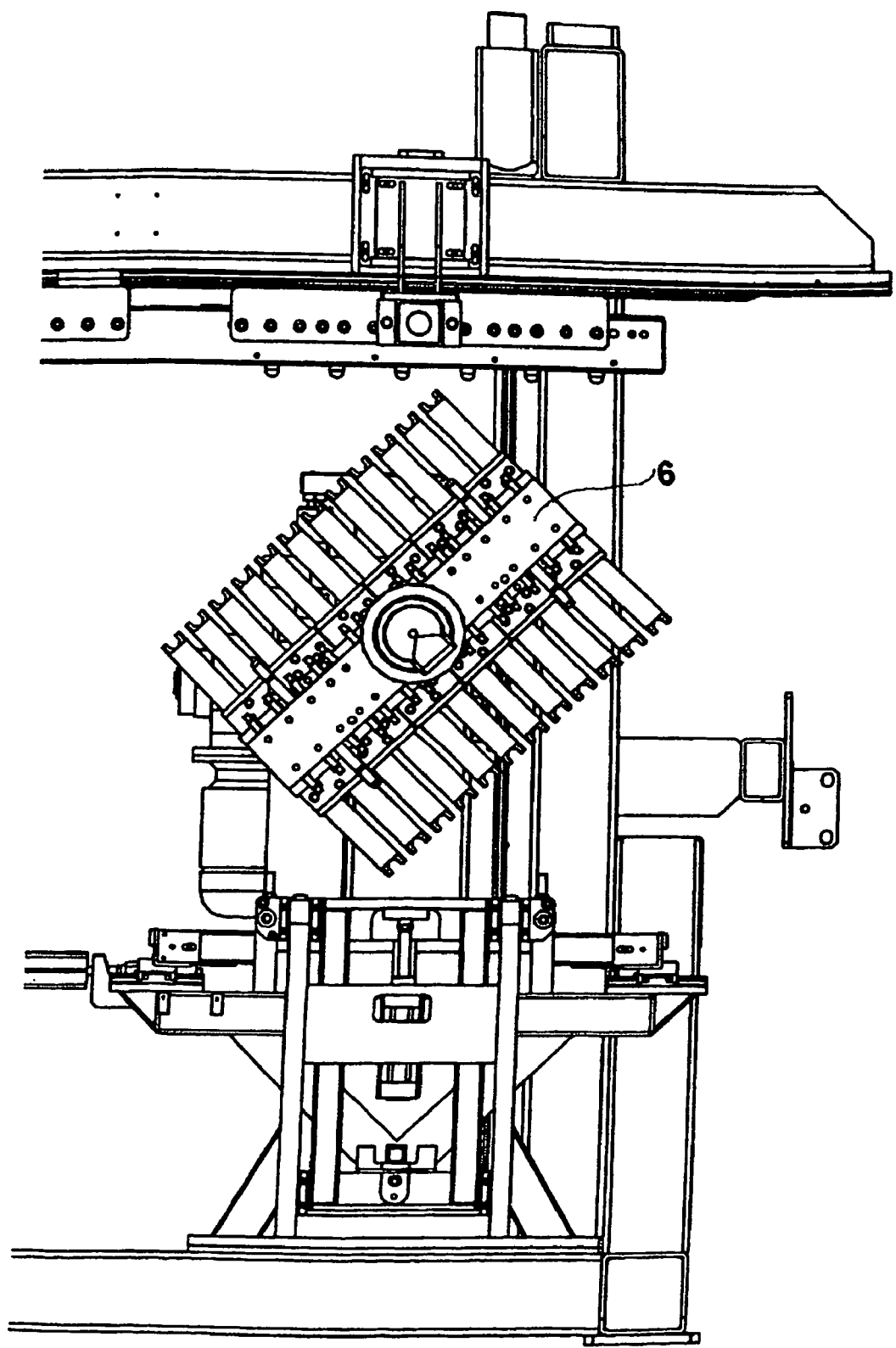
FIG. 6 shows a side view of the plant in FIG. 1 in a fourth operating stage.

In the step illustrated in FIG. 5 the turret 6 is raised as close as possible to the arm 3 and the preforms are released by actioning the guillotine-like mechanism 40, 41 and falling by gravity insert themselves exactly in the respective cups 7. Every loading operation of preforms from arm 3 to the turret 6 provides for a predefined position of arm 3 in accordance with which the geometry of cups 7 has to be filled so as to position the preforms in the right place before unloading them.

Once the load of preforms of a distinct distribution geometry and produced in a determined cycle has been accepted, the turret is lowered and therefore it is possible to rotate the turret even before the arm 3 has moved from the unloading position above the tower to the loading position between the two injection half moulds 1, 2. Thus the operativity and therefore the working times of the rotating turret becomes independent from the working times of the arm 3.

Subsequently the turret 6 is rotated at an angle of 180 degrees around the axis X in such a way that the preforms turn with the neck facing downwards. In the initial step of the filling of the cups 7 of the turret 6, the latter is not lowered towards the extraction plate 23 and it can be considered as an initial transition. The geometries of cups are filled according to a predetermined sequence which is controlled by the command means of the device. After each 180 degree rotation of the turret 6 there is performed a consecutive collection and insertion cycle of a consecutive group of preforms, identical at each cycle, so that at the conclusion of the initial step all the cups 7 are occupied by preforms 5 and there commences the regular operation of unloading of preforms 5 between one loading operation and the next.

Figure 7:
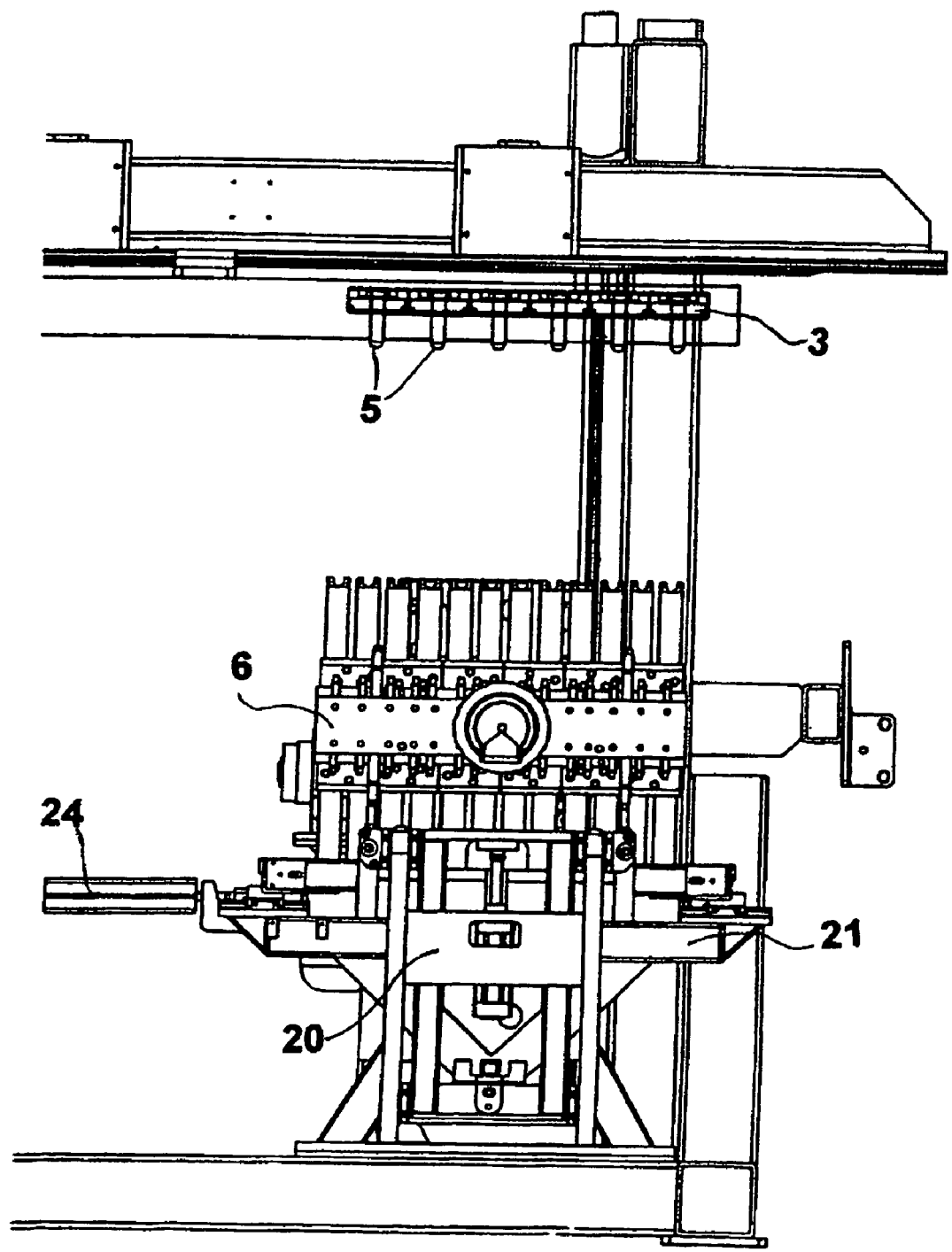
FIG. 7 shows a side view of the plant in FIG. 1 in a fifth operating stage.
Figure 8:
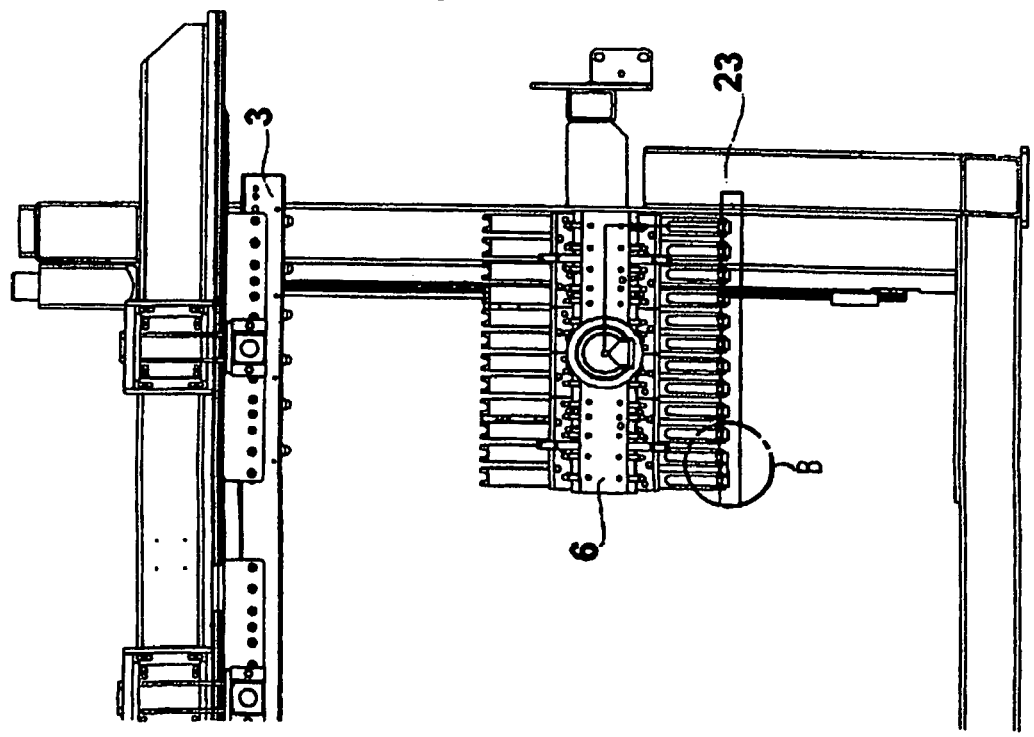
FIG. 8 shows a side view of the plant in FIG. 1 in a sixth operating stage.
Figure 12:
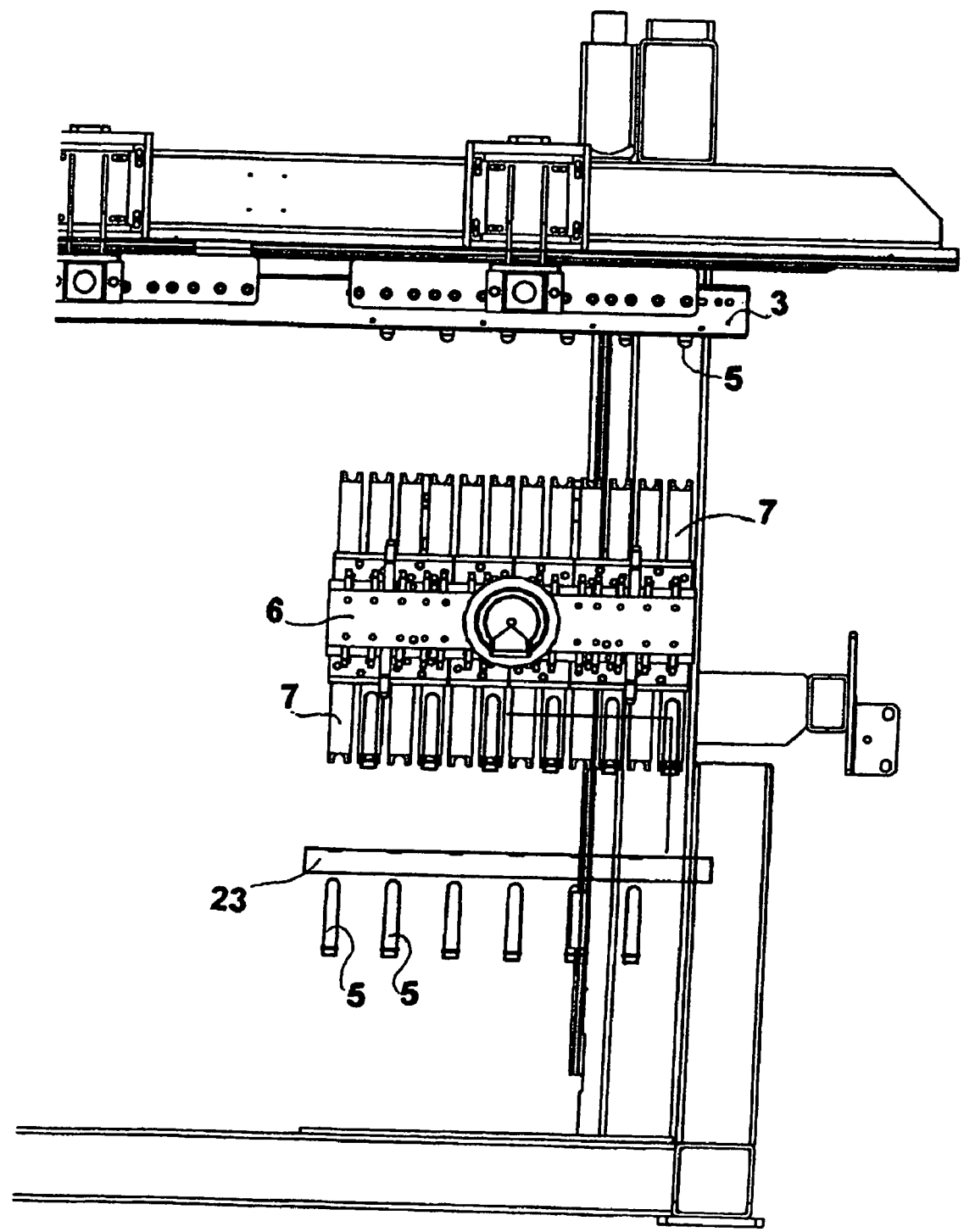
FIG. 12 shows a side view of the plant in FIG. 1 in a tenth operating stage.
Figure 13:
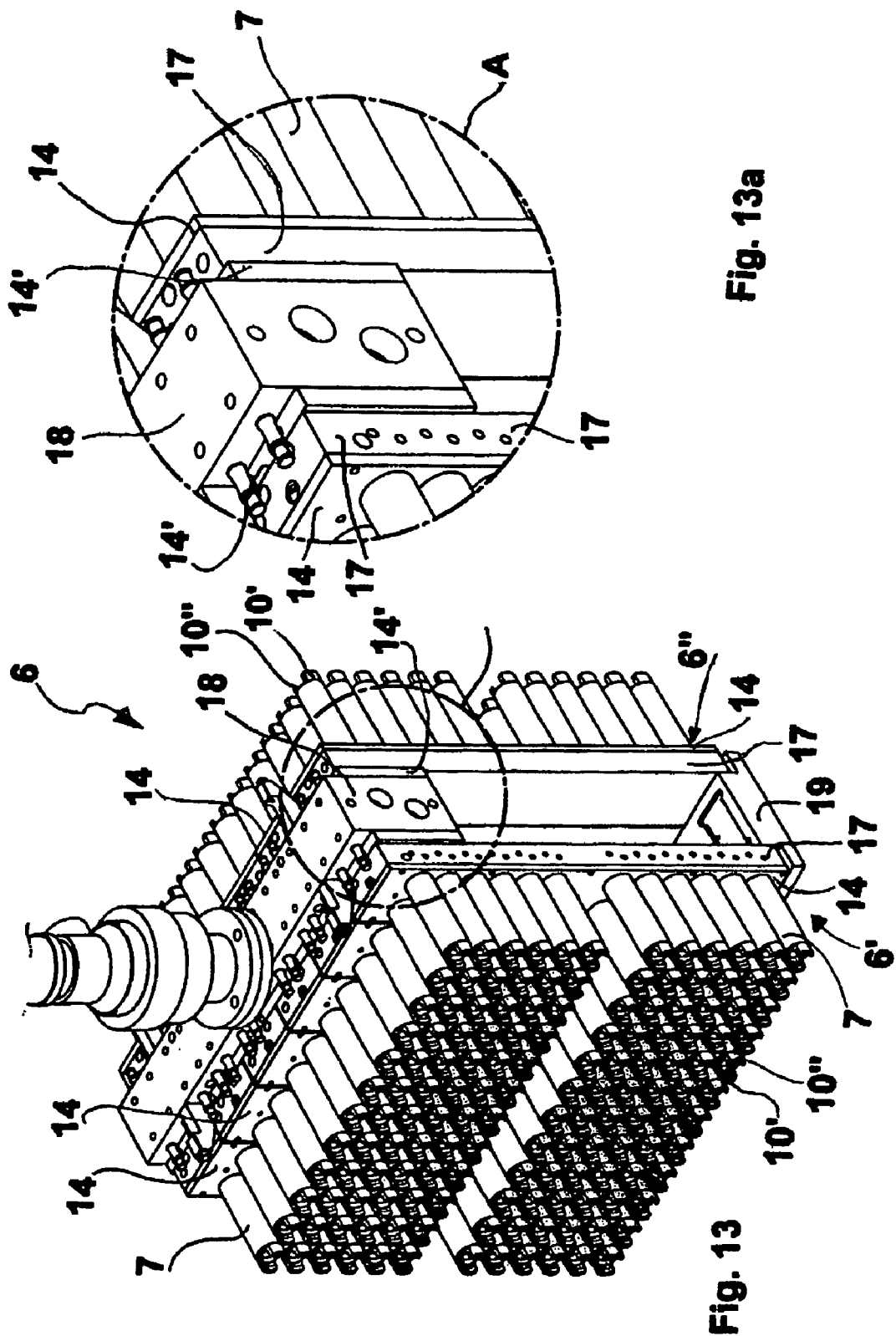
FIG. 13 shows an enlarged axonometrical view of a detail of the plant according to the present invention.

Subsequently, as shown in FIG. 7, the turret 6 is lowered more or less vertically in order to get close to the extraction plate 6. Clearly even oblique vertical movements are possible for the turret 6, without departing from the scope of this invention, just as it is possible to foresee an embodiment in which the translation movement of the turret 6 towards the extraction means can also be horizontal. The positions of the preforms 5 held in the cups of the turret face turned downwards, due to the convenient positioning of the extraction plate 23, are as illustrated in FIG. 17. The plate 23 is therefore made slid long enough to position the teeth 29, 30 by the preforms for extraction in this operation, as illustrated in FIGS. 8 and 9, which show the insertion step of the cups, and in FIGS. 10 and 11 which show the insertion step of the teeth between the ring 9 and cups and in particular in the enlargements of FIGS. 8a), 9a), 10a) and 11a). It concerns those preforms loaded firstly in the rotating turret and already sufficiently cold. Raising the turret 6, the teeth 29, 30 hold the preforms, FIGS. 10 and 11, which fall by gravity on the collection means, FIG. 12, of a known type and placed under the said turret and not illustrated.

Subsequently the turret 6 rotates by 180 degrees so that the cups, freed from the preforms, are set with the aperture facing upwards and are ready to receive a further group of preforms 5. At this point the procedure proceeds easily, in the sense that to each basic cycle there corresponds a rotation of the turret, a release from the turret of a group of preforms belonging to the same distribution geometry and which previously had been loaded before the others in the turret, a loading of the turret, by the said arm 3, of a new group of preforms with the same distribution geometry.

The solution described allows for the holding in a very restricted space and adapted for cooling of a group of preforms. The total of the different geometries available on the two surfaces 6' and 6" is prefixed on the basis of the total duration of the cooling stage of the preforms in the turret.

To improve this extraction, in an advantageous alternative embodiment of the invention, the vacuum inside the cups of each row from time to time involved in the extraction operation is also eliminated, injecting into the cups low pressure air along canals 8 using known methods which are not described. This makes the extraction of the preforms easier and permits a quicker exit of the preforms from the cups. On the other hand this alternative embodiment carries a higher production cost than the cost of alternative embodiments where no means for eliminating vacuum in the cups is envisaged.

It is therefore possible to optimise the individual work cycles and to increase the overall productivity of the device.

The invention claimed is:

1. A device for molding objects of plastic material, which comprises:
   a) an injection mold including two half-molds defining in a closed position, a plurality of injection cavities corresponding to the objects;
   b) means for moving said half-molds in reciprocal motion toward and away from each other, defining a closed position and an open position, respectively;
   c) an extraction arm for removing objects from said mold that is provided with gripping elements for gripping objects from said mold, and being translatable between a first position inserted into the space between said half-molds when said mold is in an open position, and a second position outside said half-molds;
   d) a conditioning turret having two sides in opposing relation, each side including a group of conditioning cups with means for receiving and retaining molded objects from said extraction arm, said turret being supported for rotational movement about an essentially horizontal axis followed by vertical displacement from a first higher position under said extraction arm, to a second to position relatively spaced from said extraction arm; and
   e) an extraction table positioned adjacent said second position of said conditioning turret and having associated therewith, gripping elements positioned, configured and dimensioned for engaging and selectively extracting objects from said conditioning turret cups when said gripping elements of said extraction table are translated along a path generally perpendicular to said rotational axis of said turret.

2. The device of claim 1, wherein the reciprocal motion of the half-molds is along a vertical axis.

3. The device of claim 2, wherein said gripping elements of said extraction arm are releasable and comprise guillotine-like devices.

4. The device of claim 3, wherein the translational movement of said extraction arm is horizontal.

5. The device of claim 4, wherein said extraction table includes a movable plate on the upper portion, said plate having slots in the surface thereof, which slots have teeth configured to grip the molded objects in said cups of said turret, when said plate is translated along said path generally perpendicular to said rotational axis of said turret.

6. A method for molding objects of plastic material using the device of claim 1, comprising the following steps:
   a) injecting molten plastic material into said mold formed by said two half-molds that define, in their closed position, said plurality of injection cavities to form the molded objects;
   b) solidifying the molded objects in said mold to a predetermined degree of hardness that defines an injection cycle;
   c) opening said half-molds;
   d) inserting said extraction arm in the space between said half-molds;
   e) extracting objects from said half-molds using said extraction arm;
   f) transporting the objects to a position outside said half-molds;
   g) transferring the objects to said conditioning cups of said conditioning turret;
   h) cooling the objects in said conditioning cups of said conditioning turret to a predetermined temperature;
   i) rotating said conditioning turret about said essentially horizontal axis;
   j) vertically displacing said conditioning turret from said first higher position adjacent to said extraction arm, to a second lower position relatively spaced from said extraction arm; and
   k) translating said gripping elements on said extraction table along said path generally perpendicular to said rotational axis of said turret to thereby grip the objects from said conditioning cups.

7. The method of claim 6, wherein the opening of said half-molds is effected using a motion of relative reciprocal distancing.

8. The method of claim 7, wherein the number of turret conditioning cups is a multiple of the number of injection cavities and wherein the duration of the cooling step (h) is a multiple of the duration of the injection molding cycle.

9. The method of claim 8, wherein the step of extracting the objects from said conditioning cups is performed by means of interference and frictional contact associated with said extraction table, said gripping elements being in the form of slots adapted to engage predetermined portions of the molded objects when said gripping elements of said extraction table are translated along said path adjacent said turret.

10. The method of claim 9, wherein said slots have teeth-like surface projections.

11. The method of claim 10, wherein the objects are preforms and said teeth-like surface projections are inserted between a ring situated close to a neck of the preform and the end of said respective cup in which the preform is retained.

12. A device for molding objects of plastic material, which comprises:
   a) an injection mold including two half-molds defining in a closed position, a plurality of injection cavities corresponding to the objects, one of said half-molds being higher than said other half-mold;
   b) means for moving said half-molds in reciprocal motion toward and away from each other, defining a closed position and an open position, respectively;
   c) an extraction arm for removing objects from said upper half-mold, said extraction arm being provided with a plurality of releasable guillotine-like gripping elements for gripping the objects, and being translatable between a first position inserted into the space between said half-molds when said mold is in an open position, and a second position outside said half-molds;
   d) a conditioning turret having two sides in opposing relation, each side including a group of conditioning cups with means for receiving the molded objects from said extraction arm, and retaining them in position, said turret including rows of conditioning cups for reception of the objects from said extraction arm, said conditioning turret further being supported for rotational movement about an essentially horizontal axis, followed by vertical displacement from a first higher position under said extraction arm, to a second lower position relatively spaced from said extraction arm; and e) an extraction table positioned beneath said second lower position of said conditioning turret and supporting a horizontally movable plate having a plurality of slots therein, said plate being adjacent to said conditioning turret, said slots defining teeth dimensioned, configured and positioned for engaging and selectively gripping and extracting molded objects from said conditioning turret cups when said plate is translated along an essentially horizontal path generally perpendicular to said rotational axis of said turret.

13. The device of claim 12, wherein the reciprocal motion of said half-molds is along a vertical axis.

14. The device of claim 13, wherein the translational movement of said extraction arm is horizontal.

15. A device for molding objects of plastic material, which comprises:
   a) an injection mold including two half-molds defining in a closed position, a plurality of injection cavities corresponding to the objects;
   b) means for moving said half-molds in reciprocal motion toward and away from each other, defining a closed position and an open position, respectively;
   c) an extraction arm for removing objects from said mold, said extraction arm being provided with releasable gripping elements for gripping the objects from said mold, and being translatable between a first position inserted into the space between said half-molds when said mold is in an open position, and a second position outside said half-molds;
   d) a conditioning turret having two sides in opposing relation, each side including a group of conditioning cups with means for receiving and retaining the molded objects from said extraction arm, said turret being supported for rotational movement about an axis of rotation, followed by linear displacement from a first position adjacent said extraction arm, to a second position spaced from said extraction arm; and
   e) an extraction table positioned adjacent said second position of said conditioning turret and having gripping elements dimensioned, configured and positioned for engaging and selectively extracting selective preform objects from said conditioning turret cups when said gripping elements of said extraction table are translated along a path generally perpendicular to said rotational axis of said turret.

16. The device of claim 15, wherein the reciprocal motion of the half-molds is along a vertical axis.

17. The device of claim 16, wherein the translational movement of said extraction arm is horizontal.

18. The device of claim 17, wherein said rotational axis of said conditioning turret is horizontal, and said first position of said conditioning turret is higher than said second position, and said linear displacement of said conditioning turret is vertical.

19. The device of claim 18, wherein said path of said gripping elements of said extraction table is horizontal.

20. The device of claim 19, wherein said gripping elements of said extraction table are provided by a movable plate positioned on said extraction table.

21. A device for molding objects of plastic material, which comprises:
   a) an injection mold including two half-molds defining in a closed position, a plurality of injection cavities corresponding to the objects;
   b) means for moving said half-molds in reciprocal motion toward and away from each other, defining a closed position and an open position, respectively;
   c) an extraction arm for removing objects from said mold that is provided with gripping elements for gripping objects from said mold, and being translatable between a first position inserted into the space between said half-molds when said mold is in an open position, and a second position outside said half-molds;
   d) a conditioning turret having two sides in opposing relation, each side including a group of conditioning cups with means for receiving and retaining molded objects from said extraction arm, said turret being supported for rotational movement about a rotational axis, followed by displacement from a first position adjacent said extraction arm, to a second position relatively spaced from said extraction arm; and
   e) an extraction table positioned adjacent said second position of said conditioning turret and having associated therewith, gripping elements positioned, configured and dimensioned for engaging and selectively extracting objects from said conditioning turret cups when said gripping elements of said extraction table are translated along a path adjacent to, and relative to said turret.

22. A method for molding objects of plastic material using the device of claim 21, comprising the following steps:
   a) injecting molten plastic material into said mold formed by said two half-molds that define, in their closed position, said plurality of injection cavities to form the molded objects;
   b) solidifying the molded objects in said mold to a predetermined degree of hardness that defines an injection cycle;
   c) opening said half-molds;
   d) inserting said extraction arm in the space between said half-molds;
   e) extracting objects from said half-molds using said extraction arm;
   f) transporting the objects to a position outside said half-molds;
   g) transferring the objects to said conditioning cups of said conditioning turret;
   h) cooling the objects in said conditioning cups of said conditioning turret to a predetermined temperature;
   i) rotating said conditioning turret about said turret rotational axis;
   j) displacing said conditioning turret from said first position adjacent to said extraction arm along a path generally perpendicular to said rotational axis, to a second position relatively spaced from said extraction arm and adjacent said extraction table; and
   k) translating said gripping elements associated with said extraction table along said path adjacent to, and relative to said turret to thereby grip the objects from said conditioning cups.

* * * * *